US011026398B1

(12) United States Patent
Hoffman

(10) Patent No.: US 11,026,398 B1
(45) Date of Patent: Jun. 8, 2021

(54) PET FOOD AND WATER BOWL APPARATUS

(71) Applicant: Eric David Hoffman, Plantation, FL (US)

(72) Inventor: Eric David Hoffman, Plantation, FL (US)

( * ) Notice: Subject to any disclaimer, the term of this patent is extended or adjusted under 35 U.S.C. 154(b) by 0 days.

(21) Appl. No.: 16/709,096

(22) Filed: Dec. 10, 2019

(51) Int. Cl.
*A01K 5/01* (2006.01)
*A01K 7/00* (2006.01)

(52) U.S. Cl.
CPC .............. *A01K 5/0114* (2013.01); *A01K 7/00* (2013.01)

(58) Field of Classification Search
CPC .......... A01K 5/01; A01K 7/00; A01K 5/0114; A01K 1/10; A01K 39/00; A01K 5/00
USPC ...................................... 119/51.01
See application file for complete search history.

(56) References Cited

U.S. PATENT DOCUMENTS

| | | | | |
|---|---|---|---|---|
| 4,399,772 A * | 8/1983 | Salinas | ................ | A01K 5/0142 119/51.5 |
| 4,966,099 A * | 10/1990 | Arney | ................... | A01K 5/0142 119/61.53 |
| 5,125,363 A * | 6/1992 | McGaha | ............... | A01M 29/34 119/51.5 |
| 5,277,149 A * | 1/1994 | East | ........................ | A01K 7/00 119/51.5 |
| 5,564,362 A * | 10/1996 | Fiveash | ................ | A01K 5/0142 119/51.5 |
| 5,619,952 A * | 4/1997 | Walker | ................. | A01K 5/0142 119/61.53 |
| D402,425 S * | 12/1998 | Lacz | ............................ | D30/121 |
| 5,881,671 A * | 3/1999 | Riedl | ................... | A01K 5/0142 119/61.53 |
| 6,167,840 B1 * | 1/2001 | White | .................. | A01K 5/0142 119/61.53 |
| 6,860,229 B1 * | 3/2005 | Craft | .................... | A01K 5/0142 119/61.5 |
| 7,219,622 B1 * | 5/2007 | Powers | ............... | A01K 5/0142 119/51.5 |
| D552,802 S * | 10/2007 | Kuster | ........................ | D30/129 |
| 7,284,499 B1 * | 10/2007 | Kuster | ................. | A01K 5/0114 119/51.5 |
| D556,954 S * | 12/2007 | May | ............................. | D30/129 |
| D637,770 S * | 5/2011 | Lipscomb | .................... | D30/121 |
| D665,134 S * | 8/2012 | Lipscomb | .................... | D30/121 |
| 8,360,005 B1 * | 1/2013 | Allen | .................. | A01K 5/0142 119/61.53 |
| 8,813,683 B2 * | 8/2014 | Lipscomb | ............ | A01K 45/002 119/74 |
| 9,485,959 B2 * | 11/2016 | Lucky | ................. | A01K 5/0142 |
| D892,412 S * | 8/2020 | Guo | ............................ | D30/121 |
| 2006/0096545 A1 * | 5/2006 | Cone | .................... | A01K 5/0142 119/61.53 |

(Continued)

*Primary Examiner* — Magdalena Topolski
*Assistant Examiner* — Kevin M Dennis
(74) *Attorney, Agent, or Firm* — The Concept Law Group, PA; Scott D. Smiley; Scott M. Garrett

(57) ABSTRACT

A pet food and water bowl apparatus includes a first bowl which is configured to contain water for a pet to drink, and the completely surround a support structure on which a second bowl for food in mounted. Surrounding the support structure with water prevent crawling insects from getting to the food in the second bowl. The second bowl is also configured to prevent food from falling into the water in the first bowl through changes in orientation of the second bowl.

19 Claims, 20 Drawing Sheets

(56) References Cited

U.S. PATENT DOCUMENTS

| | | | |
|---|---|---|---|
| 2006/0196433 A1* | 9/2006 | Ness | A01K 5/0114 119/52.1 |
| 2007/0119378 A1* | 5/2007 | Fick | A01K 5/0114 119/52.1 |
| 2008/0257272 A1* | 10/2008 | Bolda | C02F 1/325 119/72 |
| 2009/0056633 A1* | 3/2009 | McDaniel | A01K 5/0142 119/51.5 |
| 2010/0170447 A1 | 7/2010 | Pridgen, Jr. | |
| 2011/0259273 A1* | 10/2011 | Lipscomb | A01K 7/02 119/74 |
| 2012/0103267 A1* | 5/2012 | Amig | A01K 5/0114 119/61.3 |
| 2013/0233248 A1* | 9/2013 | Veness | A01K 5/0275 119/56.1 |
| 2015/0136031 A1* | 5/2015 | Evans | A01K 39/012 119/51.01 |

\* cited by examiner

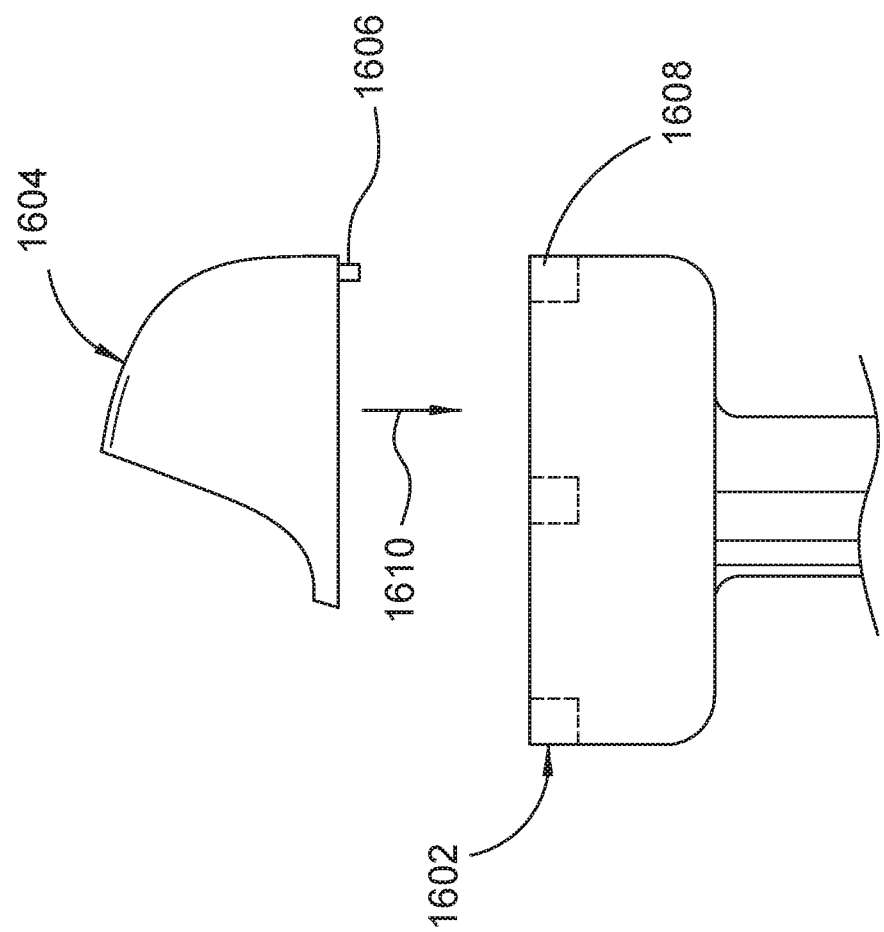

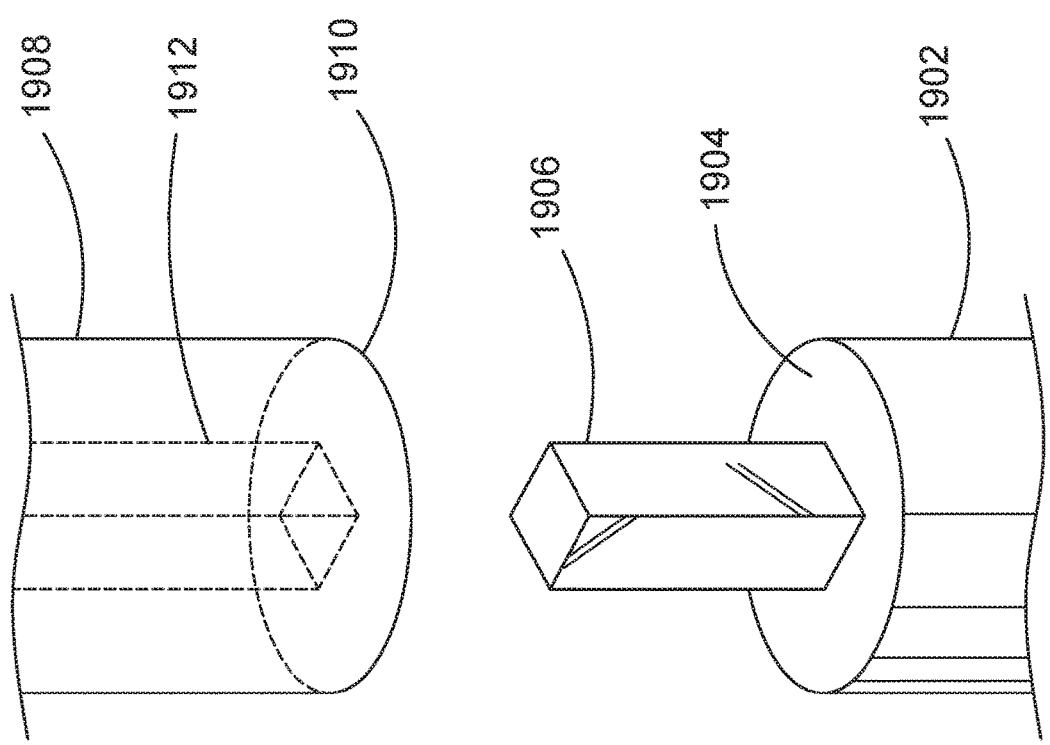

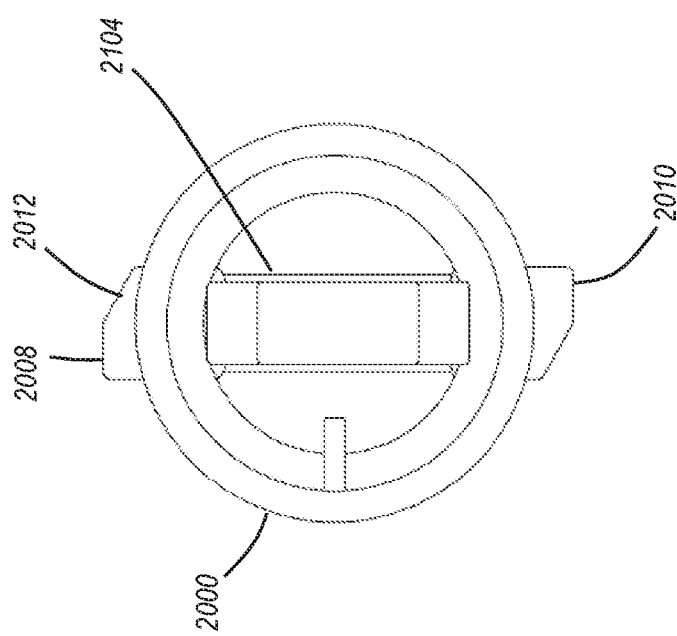

PET FOOD AND WATER BOWL APPARATUS

FIELD OF THE INVENTION

The present invention relates generally to pet food and water stations, and more particularly to a pet food bowl and water apparatus that prevents crawling insects and other pests from being able to get into the pet's food bowl, and which prevents fouling of the water as a result of food falling into the water.

BACKGROUND OF THE INVENTION

A common feeding arrangement for pets, particularly cats and dogs, is to provide two bowls; one for food and one for water. While simple and effective, this arrangement can lead to a problem, which is that if the food is not immediately eaten, it can attract insects. The tendency of pet food to attract insects is not desirable for the pet owner, and is it not desirable to have a pet ingest insects, which may poisoned from insecticide. As a result, there have been some food and water bowl systems developed that isolate the food bowl using water, where the food bowl is supported over a basin that is configured to be filled with water, such that water surrounds the food bowl support structure, thereby leaving no path for crawling insects to get to the food bowl, so long as water is maintained in the support basin.

In some systems this concept has been extended by configuring the water basin to allow the pet to access the water and drink from the basin, with the food bowl directly over the water basin. However, a problem is created by food falling from the food bowl into the water basin, and fouling the water in the water basin, which can then attract insects to the fouled water.

Therefore, a need exists to overcome the problems with the prior art as discussed above.

SUMMARY OF THE INVENTION

In accordance with some embodiments of the inventive disclosure, there is provided a pet food and water bowl apparatus includes a first bowl and a second bowl stacked in a vertical relationship, wherein the second bowl is positioned over a portion of the first bowl on a column that extends upward from a basin of the first bowl, and wherein the column is surrounded by the basin of the first bowl. The first bowl can have an exposed portion that extends horizontally beyond a vertical (downward) projection of the second bowl, meaning the perimeter or outline in a horizontal plane projected downward. The first bowl can further have a covered portion under the second bowl in which the column is mounted. The second bowl can have a basin and a rim around the basin, and further have a cover which extends upward from a portion of the rim and over the basin of the second bowl to partially cover the basin of the second bowl.

In accordance with another feature, the second bowl is sized such that it extends outward horizontally such that its vertical projection is outside of a majority of the covered portion of the first bowl.

In accordance with another feature, the column comprises at least an upper portion and a lower portion, the upper portion being coupled to the second bowl and the lower portion being coupled to the first bowl in the basin of the first bowl, and wherein the upper and lower portions are adjustable with respect to each other to at least two positions thereby allowing adjustment of the second bowl to at least two orientations with respect to the first bowl.

In accordance with another feature, wherein at least one of the orientations orients an open portion of the second bowl directly away from the exposed portion of the first bowl.

In accordance with another feature, there is further provided a weight retaining feature on an underside of the first bowl that is configured to retain a weight plate.

In accordance with another feature, wherein the column is height adjustable.

In accordance with another feature, the column is configured to be modular, and wherein the column comprises an upper portion and a lower portion and can receive at least one middle portion to adjust the height of the column.

In accordance with another feature, the cover of the second bowl is detachable from the second bowl.

In accordance with some embodiments of the inventive disclosure, there is provided a pet food and water station for keeping crawling insects out of pet food and for keeping pet food out of water, the pet food and water station including a water bowl having a basin, the basin having a drinking portion and a covered portion. The station can further include a base extending vertically from the covered portion and positioned in the water bowl so as to be surrounded by water when water is present in the basin of the water bowl. The station can further include a food bowl mounted on top of the base. The food bowl can have a cover that extends over a portion of the food bowl. The food bowl can have an uncovered portion over which the cover does not extend. The food bowl can be sized so that the uncovered portion of the food bowl extends, horizontally, farther outward than the covered portion of the water bowl beneath the uncovered portion of the food bowl.

In accordance with another feature, the base is height adjustable.

In accordance with another feature, the base includes a feature that prevents the food bowl from being positioned such that the uncovered portion of the food bowl over the drinking portion of the water bowl.

In accordance with another feature, the cover is integrally formed on the food bowl.

In accordance with another feature, the cover is a separate piece from the food bowl and is configured to attach to a rim of the food bowl.

In accordance with another feature, the cover is configured to attach to the rim of the food bowl in at least two locations, and the rim lacks features to allow attaching the cover to the rim such that the uncovered portion of the food bowl would be over the drinking portion of the water bowl.

In accordance with another feature, there is further provided a weight retaining feature on an underside of the water bowl that is configured to retain a weight plate.

In accordance with some embodiments of the inventive disclosure, there is provided a pet feeding apparatus, including a water bowl having a basin configured to hold water, a drinking portion, and a covered portion. The apparatus can further include a base that extends vertically upward from the covered portion and is positioned in the basin so as to be surrounded by water when water is in the basin of the water bowl. The apparatus can further include a food bowl that is configured to be mounted on top of the base. The food bowl can have a cover that extends over a portion of the food bowl and around at least a majority of a rim of the food bowl, and wherein a horizontal orientation of the food bowl can be changed such that an uncovered portion of the food bowl can be oriented to face away from the drinking portion of the water bowl, or to a first side or a second side, and not facing the drinking portion of the water bowl.

In accordance with another feature, the base is height adjustable.

In accordance with another feature, there is further provided a weight retaining feature on an underside of the water bowl that is configured to retain a weight plate.

In accordance with another feature, the food bowl is mounted on the base and retained on the base by retractable protrusions in the base that interface with corresponding holes in an extension at a bottom of the food bowl.

Although the invention is illustrated and described herein as embodied in a pet food and water bowl apparatus, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the support column, or the water basin, depending on the context. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 16 shows a side view an alternative arrangement for bowl having a cover that attaches to a food bowl, and which can be repositioned on the food bowl, in accordance with some embodiments;

FIG. 19 is a partial perspective view of a support structure for supporting a food bowl over a water bowl, in accordance with some embodiments;

FIG. 22 is a bottom view of a support section including a retaining feature having opposing deflectable projections, in accordance with some embodiments.

DETAILED DESCRIPTION

Figure 1:
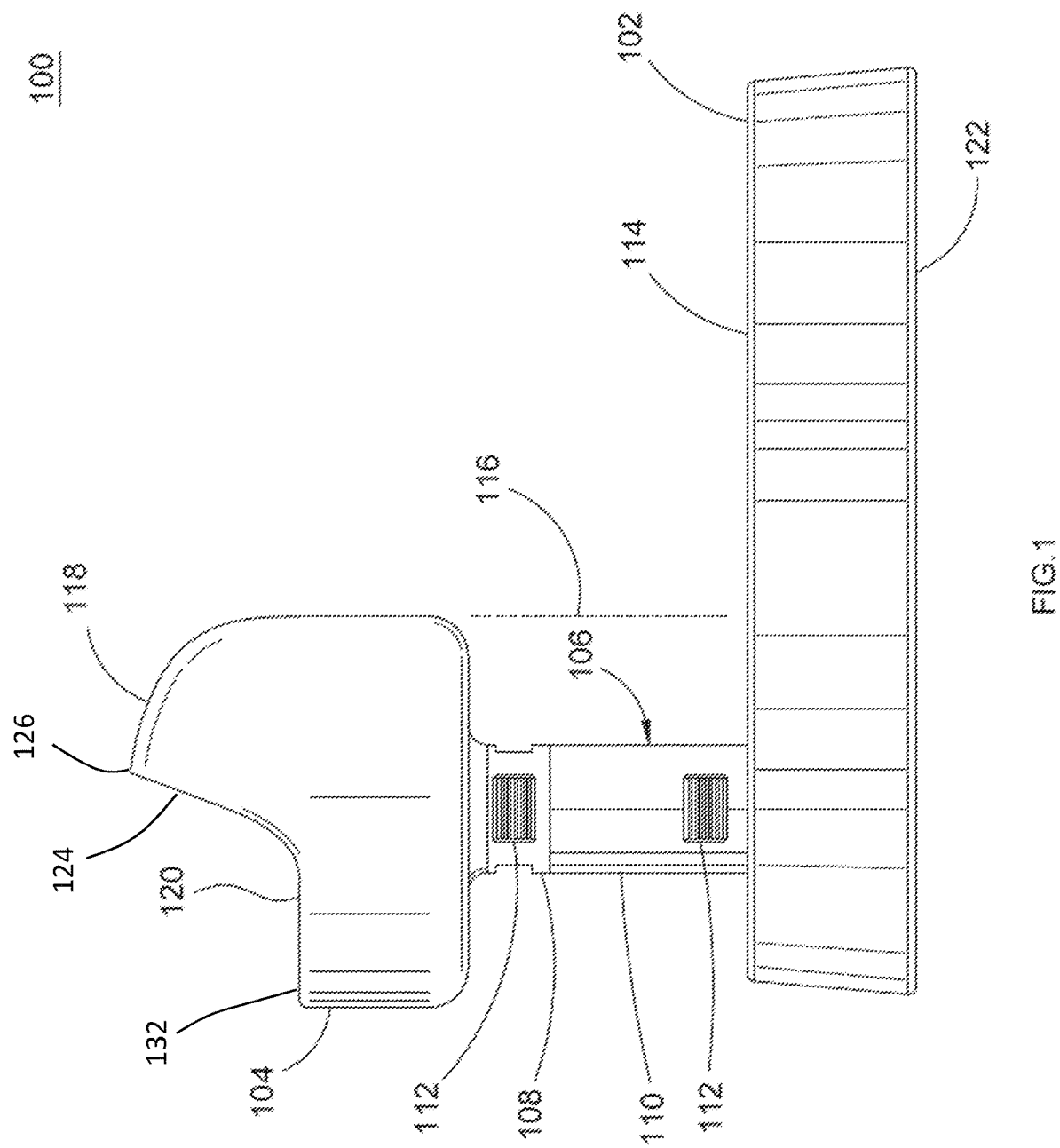
FIG. 1 is a side elevational view of a pet food and water bowl apparatus, in accordance with some embodiments.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient pet food and water bowl system. Embodiments of the inventive disclosure provide a pet food bowl that is supported over a water basin such that, when the water basin contain water, the structure that supports the food bowl is surrounded by water, and the water is accessible for the pet to drink. Further, the food bowl is configured to prevent food falling from the bowl into the water basin below. In addition, embodiments of the inventive disclosure provide that the food bowl orientation can be changed over a range of approximately 180 degrees to allow the owner to configure the system to fit in a variety of locations. Furthermore, the height of the food bowl over the water basin can be adjusted to suit the particular size of the pet being fed and watered with the system.

FIG. 1 is a side elevational view of a pet food and water bowl system 100, in accordance with some embodiments. FIGS. 2-4 and 9 show a similar system and common features will use common reference numerals throughout the following disclosure. The system 100 includes a first bowl 102 and a second bowl 104 in a stacked vertical relationship, with the second bowl 104 being positioned over a portion of the first bowl 102. The first bowl 102 is configured to be a water basin to hold water for a pet to drink and also to isolate the support structure 106 that holds the second bowl 104 over the first bowl 102. That is, when water is placed in the first bowl 102, the water surface will surround the support structure 106, isolating it from the rim 103 of the first bowl, thereby eliminating any surface by which an insect could crawl from the rim 103 to the support structure 106, and up into the second bowl 104. Thus, both the first bowl 102 and the second bowl 104 contain respective volumes that are surrounded by the walls of the bowls, and which have an open or accessible top which allows a pet to access material provided in the bowls (e.g. food or water).

Figure 2:
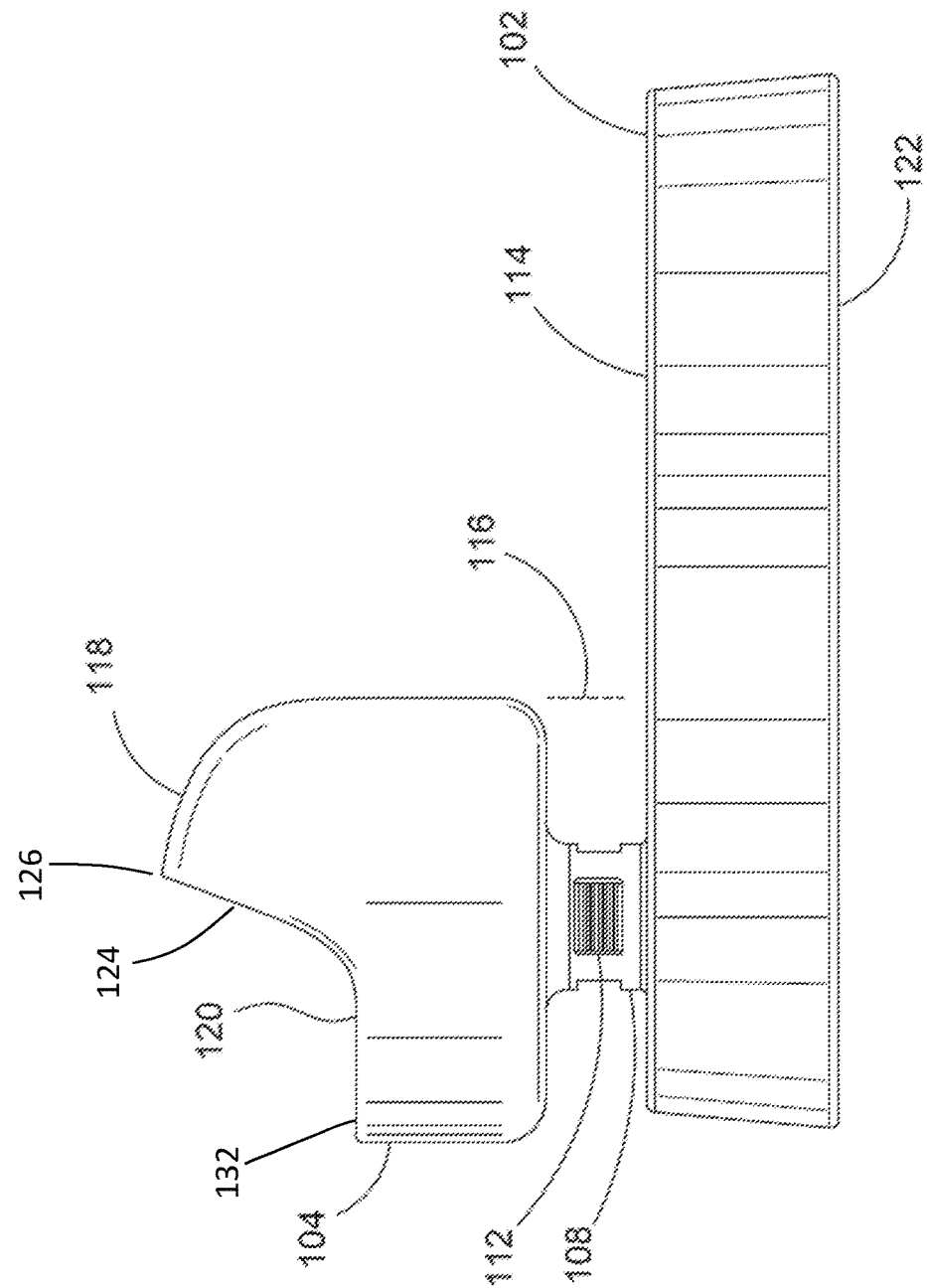
FIG. 2 is a side elevational view of a pet food and water bowl apparatus, in accordance with some embodiments.

The support structure 106 can include a single column or post structure that has a bottom end connected to the floor or bottom of the first bowl 104. The top of the support structure mates with a support for the second bowl 104, which can be a portion of the second bowl 104, at the bottom of the second bowl 104, or it can be another structure configured to receive the second bowl 104. Accordingly, the upper and lower portions of the column are adjustable with respect to each other, allowing for a user to adjust the height of the second bowl 104. The support structure is located over one side of the first bowl 102, a covered portion 115, such that the second bowl 104 does not cover a drinking portion 114 of the first bowl 102, as indicated by boundary line 116 (e.g. to the right of line 116 the first bowl 102 is open and freely accessible). The covered portion 115 is the portion of the first bowl 102 that is under the second bowl 104. The covered portion 115 and the drinking portion 114 are contiguous with each other in some embodiments, but can be separate portions of the first bowl 102 with a barrier between them in some embodiments. The support structure 106 can be height-configurable, meaning it can be adjusted or changed to support the second bowl 104 at one of several selectable heights over the first bowl 102. For example, the support structure 106 as shown include a first segment 108 and a second segment 110. These segments 108, 110 interlock using retaining features that will be described in relation to FIGS. 5-8. The retaining features include an extension that acts as a cantilevered member that has a button portion 112 that fits within a window of a mating section. Thus, a user can press on the button portions 112 to push the retaining feature inward, allowing clearance of the retaining feature with respect to the window, and thereby allowing the segments (e.g. 108, 110) to be separated and removed as desired. Thus, the first bowl 102 includes an attachment feature in the basin of the first bowl 102 (not seen in this view) to which segments for the support structure 106 can be attached, such as segments 108, 110. Likewise, the bottom or underside of the second bowl 104 includes a mating feature or features that couple with the top of a segment 108, 110 (here segment 108) to mount the second bowl 104 over the covered portion of the first bowl 102. The support structure 106 is further configured to adjust the rotational orientation of the second bowl 104 in a horizontal plane over the first bowl 102. FIG. 2 shows the system of FIG. 1 in a second side view 200 with the support structure 106 adjusted by removing segment 110 from the support structure 106 to position the second bowl 104 at a lower height.

The second bowl 104 is configured to prevent food that is placed in the second bowl 104 from falling into the first bowl 102. This is accomplished, in part, by a partial cover 118 that extends upwards from a rear side of the rim 132 of the second bowl 104. The partial cover 118 can further extend partially over the basin of the second bowl 104, leaving an opening 120 by which food can be placed into the second bowl 104, and a pet can then access the food in the second bowl 104. The partial cover 118 also extends, not just upwards from the back of the second bowl 104, but also horizontally around part of the second bowl 104. In some embodiments, the partial cover 118 can extend around approximately half of the second bowl 104, and the second bowl 104 can have a circular basin around which the partial cover 118 extends (e.g. along a semi-circle). The partial cover 118 has a front rim 124 that extends upward from the rim 132 of the second bowl 104 at a first side 128 and a second side 130, that is opposite the first side 128 across the basin of the second bowl 104, over the basin of the second bowl 104, to a top 126 of the partial cover 118, that is over the basin of the second bowl 104. The front rim 124 defines a vertical opening between the covered and uncovered portions of the basin of the second bowl.

Figure 3:
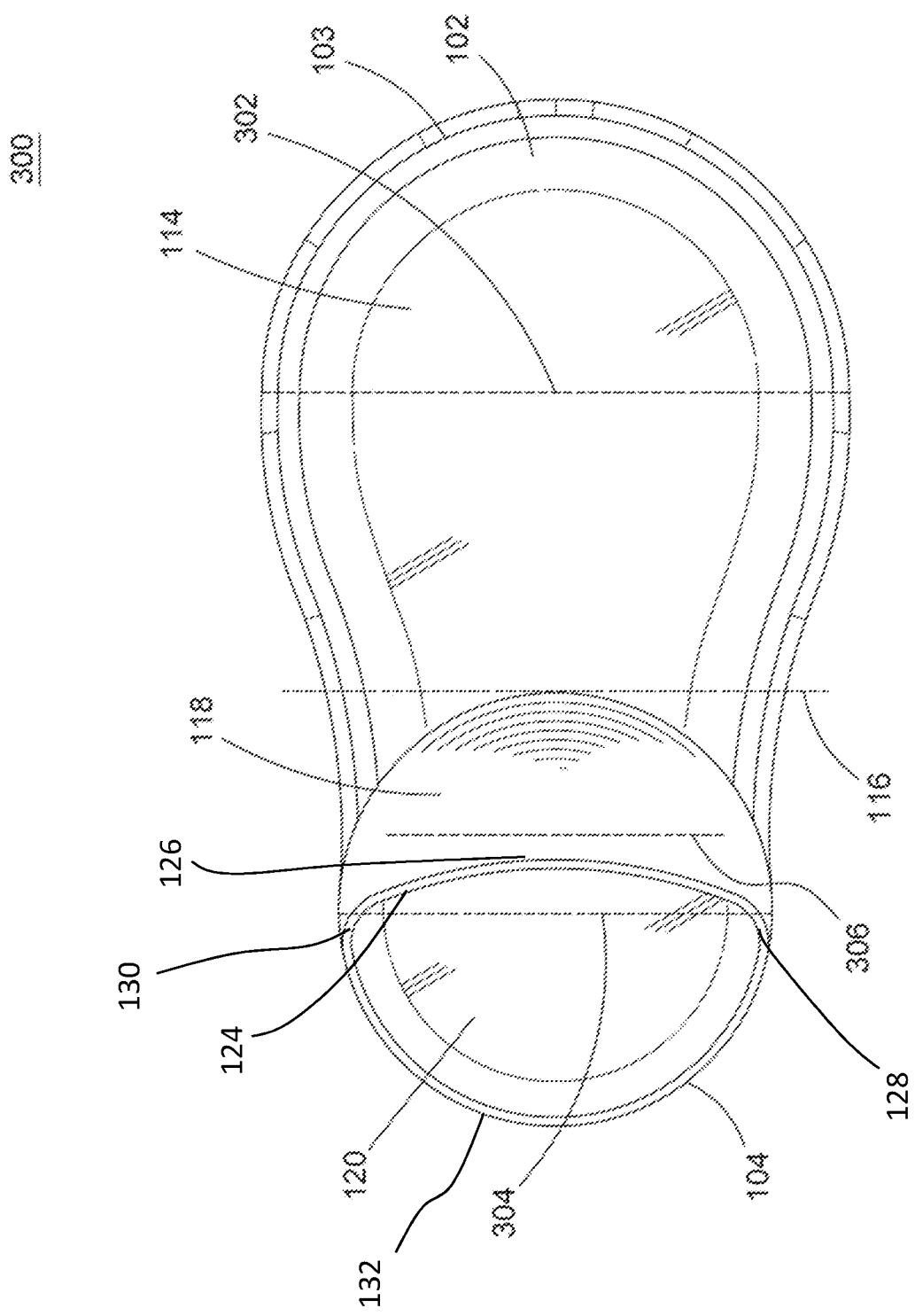
FIG. 3 is a top plan view of a pet food and water bowl apparatus, in accordance with some embodiments.

FIG. 3 is a top plan view 300 of a pet food and water bowl apparatus, in accordance with some embodiments. The pet food and water bowl apparatus shown here can be substantially identical to that of FIGS. 1-2, and in this view it can be seen that the first bowl 102 has a drinking portion 114. The basin of the first bowl 102 further includes a covered portion under the second bowl 104. Both the open portion 114 and the covered portion can, in some embodiments, have a semi-circular shape. However the diameter of the circles on which each portion are based differ. For example, diameter or width 302 across the drinking portion 114 is larger than either the diameter or width 306 of the basin at the covered portion, as well as the outside diameter 304 of the second bowl 104. And more particularly, the outside diameter 304 of the second bowl 104 is larger than the diameter or width 306 of the covered portion under the second bowl 104. By making the outside diameter 304 of the second bowl 104 larger than the diameter or width 306 of the covered portion under the second bowl 104, and food that falls out of the second bowl 104 will not fall into the first bowl 102. Thus, the second bowl 104 is sized so that it extends outward horizontally such that its vertical projection is outside of a majority of the covered portion of the first bowl 102. As shown here, the second bowl 104 is oriented on the support structure (which can't be seen in this view as it is under the second bowl 104) such that the opening 120 is oriented away from the drinking portion 114 of the first bowl 102. The partial cover 118 prevents any food from falling from the second bowl at the backside of the second bowl 104 as well as the adjacent sides as the partial cover 118 extends around approximately (e.g. +/−10%) half of the rim of the second bowl 104. Having the drinking portion 114 wider than the covered portion in the first bowl can add to the stability of the apparatus to ensure that even vigorous feeding from the second bowl 104 will not tip the apparatus over.

Figure 4:
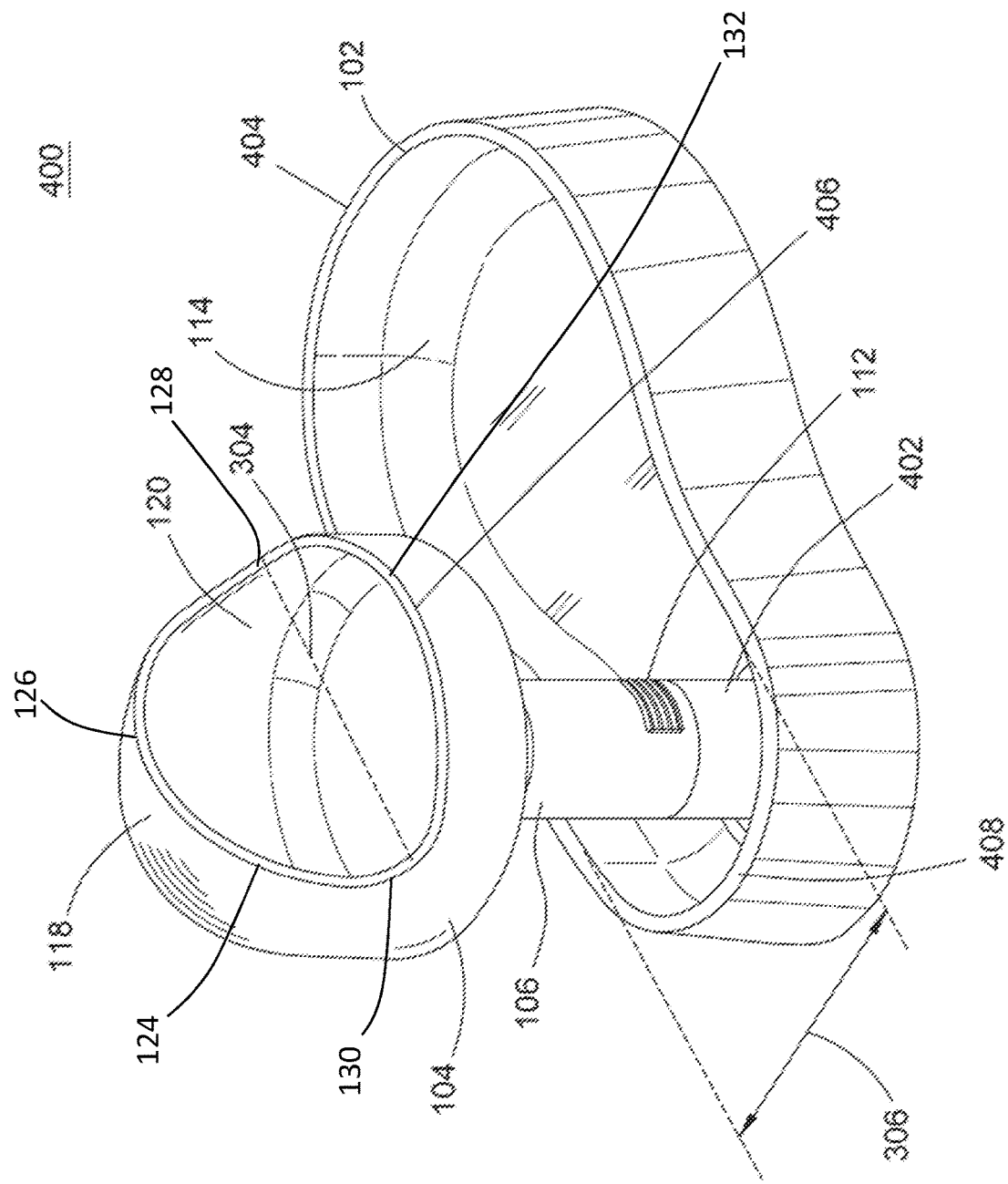
FIG. 4 is a perspective view of a pet food and water bowl apparatus, from a top and side angle, in accordance with some embodiments.

FIG. 4 is a perspective view 400 of a pet food and water bowl apparatus, from a top and side angle, in accordance with some embodiments. Again, the apparatus shown here is substantially similar to that of FIGS. 1-3. In this view the basins of the first and second bowls 102, 104 can be seen. A base 402 in the covered portion of the first bowl is shown, and is the foundation for the columnar support structure 106. The first bowl 102 is can define a first end 404 and a second end 408, that is opposite the first end 404. A line could be drawn from the first end 404 to the second end 408 across the first bowl 102 to provide a reference with respect to the orientation of the second bowl 104, which is shown here turned ninety degrees with respect previous drawings. That is, the front 406 of the second bowl 104 is shown facing to a side, rather than towards the second end 408 of the first bowl 102. The support structure 106 is configured to allow the second bowl to be oriented as shown here, as in FIGS. 1-3, or facing one hundred eighty degrees in the opposite direct from that shown here. Further, the support structure 016 can be configured to prevent the second bowl 104 from facing toward the first end 404 of the first bowl 102. That is, to prevent the front 406 of the second bowl 104 from facing towards the first end 404. In accordance with such embodiments, then, the apparatus is configurable to allow the second bowl 104 to be oriented through a range of about one hundred eighty degrees to allow the user to orient the second bowl 104 to be oriented in a way that allows easiest use of the apparatus in the space given, wherever the apparatus is used. When oriented as shown here in FIG. 4, the partial cover 118, since it extends approximately halfway around the second bowl, prevents food from falling into the first bowl. However, if the second bowl were oriented with the front 406 of the second bowl 104 oriented towards the first end 404 of the first bowl 102, then food could fall from the second bowl into the first bowl. Accordingly, the apparatus can be provided with features to prevent the second bowl 104 from being oriented towards the drinking portion 114 of the first bowl 102, or it can be left to the user to not so orient the second bowl 104.

FIGS. 3 and 4 show the second bowl 104 is two different horizontal orientations. In FIG. 3 the uncovered portion or opening 120 is oriented to face away from the drinking portion 114. In FIG. 4 the opening 120 is oriented to face to one side, but could be oriented to face to the opposite side. The cover 118 extends around the rim of the second bowl around at least half of the rim, and preferably more, to act as a barrier to food falling into the water below. In some embodiments the mounting structure of the base and the second bowl can be configured to prevent the opening 120 from facing towards the drinking portion 114.

Figure 5:
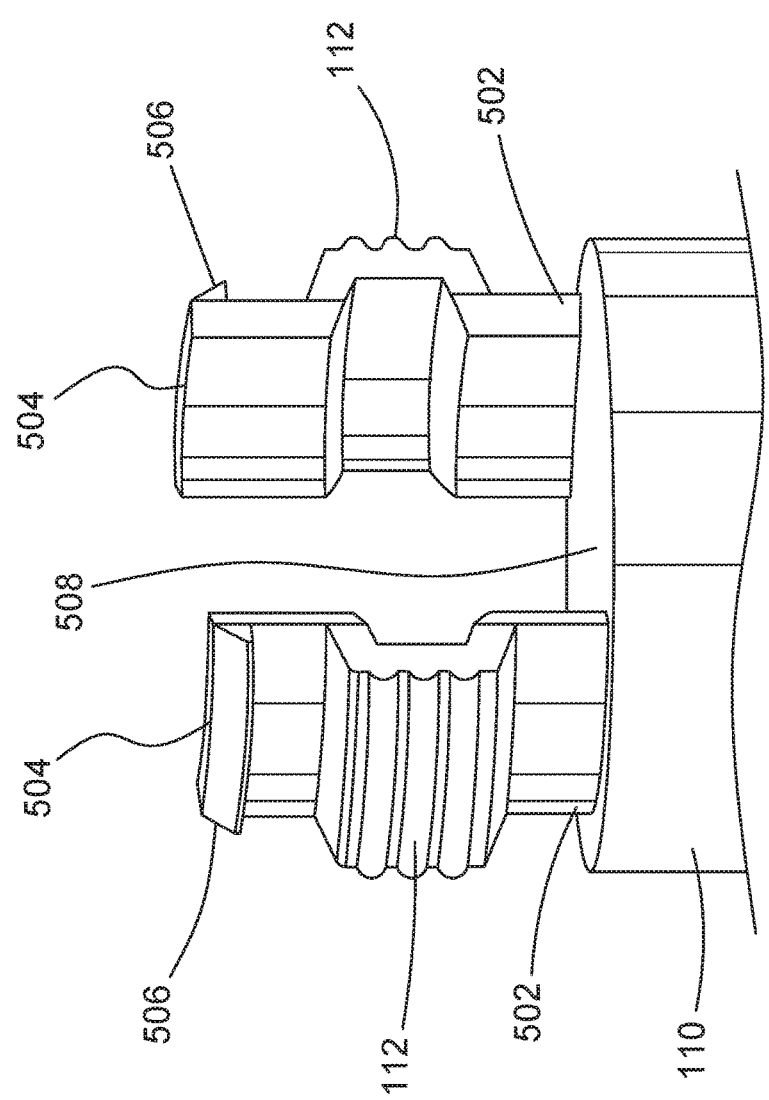
FIG. 5 is a side view of a retaining feature for holding a pet food bowl, in accordance with some embodiments.

FIG. 5 is a side view of a retaining feature 500 for holding a pet food bowl, in accordance with some embodiments. Specifically the retaining feature 500 is formed on the support structure segments such as segment 110 shown here. Various forms of retaining features will occur to those skilled in the art, but the purpose is to hold the second bowl in a selected orientation (i.e. horizontal rotation) with respect to the first bowl. A pair of cantilevered members 502 extend from a top 508 of the segment 110, and are made of a resilient material that can be deflected from their resting position by pressing inward (e.g. towards each other) on the button portion 112. A top end 504 will move inward when the button portion 112 is so acted upon, allowing a ramped lip 506 to clear the edge of a window formed in adjoining segment. The ramped lip 506 starts at the top outside edge of the cantilevered members 502, and extends outward at an angle to a terminal edge which is perpendicular to the side of the cantilevered member. The resulting ramp face created by the outside allows the cantilevered members 502 to be deflected inward upon inserting them into another segment, and the underside of the ramped lip 506 forms a bearing surface which engages a retaining ridge inside the adjoining segment.

Figure 6:
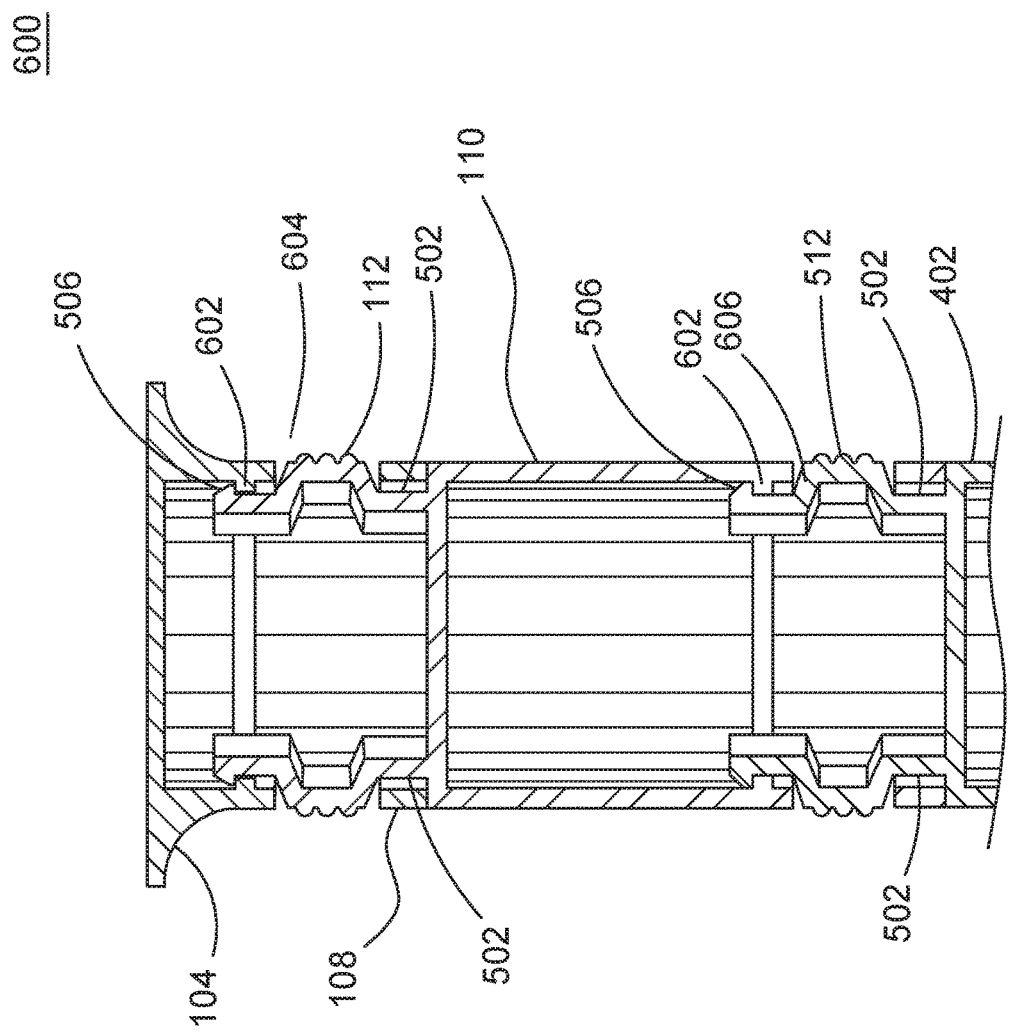
FIG. 6 is a cut-away side view of a column assembly for holding a pet food bowl over a water basin, in accordance with some embodiments.

FIG. 6 is a cut-away side view 600 of a column assembly for holding a pet food bowl over a water basin, in accordance with some embodiments. In particular, the view 600 shows the interconnection of segments 108, 110, and the interconnection of segment 110 to base 402, each of which have retaining corresponding retaining features. Segment 108 can alternatively be the extension on the bottom of the second bowl 104. Both the base 402 and segment 110 have cantilevered members 502 on their top ends. Each of the cantilevered members includes a button portion 112 that fits within a window 604, which is an opening in the side of the segment or extension. The windows are provided in an arrangement that corresponds to the positioned of the cantilevered members 502. Thus, when there are two opposing cantilevered members 502, the windows 604 in the adjoining support structure component are arranged in an opposing manner as well. To join the support structure components, the bottom of one component is placed over a lower positioned component. So the bottom segment 110 can be placed over the cantilevered members 502 of the base 402. The fit of the components is such that the cantilevered members 502 of the base are deflected inward by the interference between the ramped lip 506 and the wall of the segment 110. Further, the top 606 of the button portion 112 is ramped as well to similarly allow passage into the adjoining segment 110. The inside of the segment 110 and other components includes a retaining ridge 602 that is positioned such that when the adjoining segment is abutting the top of the lower segment/component, the ramped retaining lip 506 will be clear of the ridge 602 and the underside of the ramped lip 506 will be engaged with the top of the retaining ridge 602, and the button portions 112 will be seating in a corresponding window 604, thereby retaining the segments together. To release the segments, the user simply pushes inward on the opposing button portions 112 to clear the ramped lip 506 over the retaining ridge 602, and then the segments can be moved apart. Thus, the opposing windows 604 allow the second bowl to be oriented in opposing orientations. Additional windows can allow for still other orientations.

Figure 7:
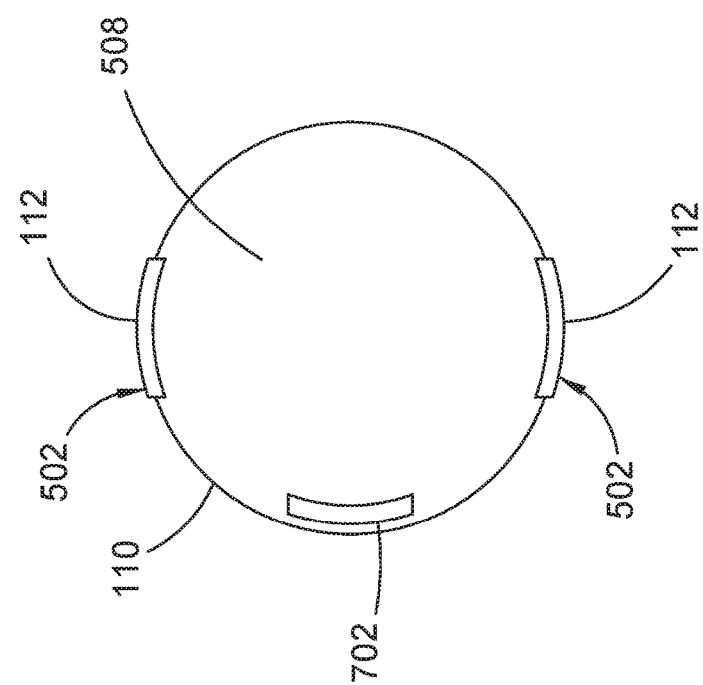
FIG. 7 is a top view of a column section for elevating a pet food bowl over a water basin, in accordance with some embodiments.

FIG. 7 is a top view of a column segment 700 for elevating a pet food bowl over a water basin, in accordance with some embodiments. The segment 700 can be substantially similar to segment 110, and includes a top surface 508. In some embodiments, however, the segment 700 can be hollow and tubular, and as such, would have a cylindrical wall. The segment 700 includes two opposing cantilevered members 502 that each include a button portion 112. By "opposing," as used here, it is meant that the two cantilevered members 502 are on opposite sides of the top of the segment with respect to each other. The cantilevered members 502 extend upward (i.e. out of the page as shown here) to a free end that includes a ramped lip, as previously described. An orientation feature 702 can be provided to prevent the second bowl from being oriented such that it faces the open portion of the first bowl. The orientation feature 702 can simply be a protrusion that fits within the adjoining component, and interferes with a corresponding feature (e.g. 804 of FIG. 8) to prevent orienting the second bowl in a particular orientation.

Figure 8:
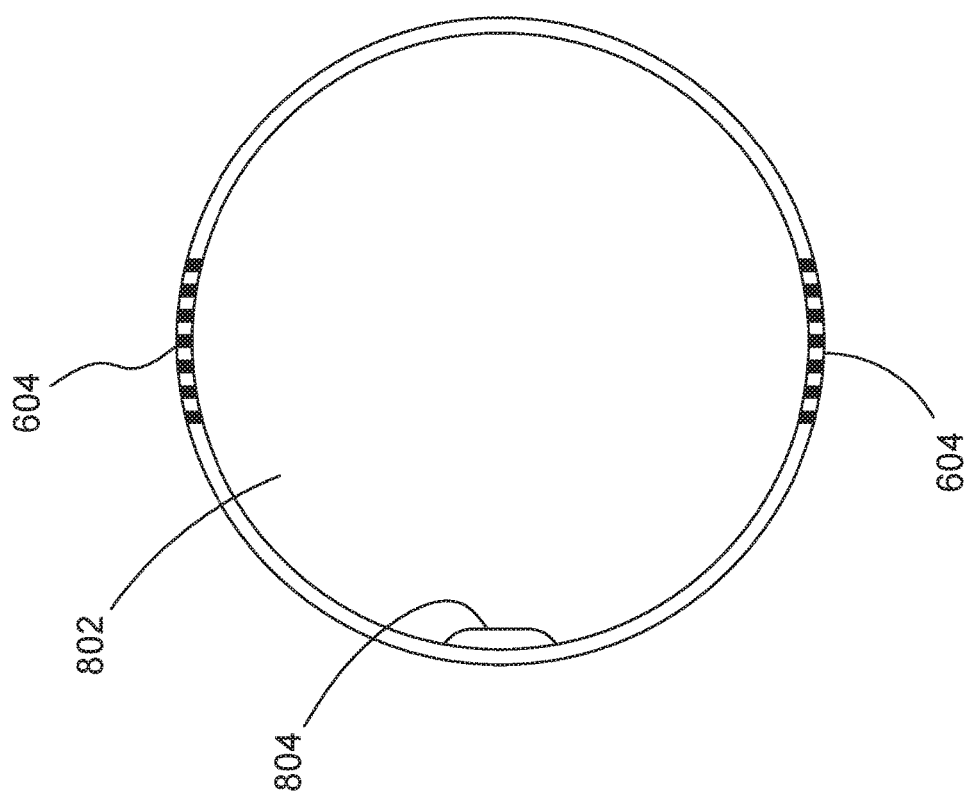
FIG. 8 is a bottom view of a bowl extension that mates with a top portion of a column section for elevating a pet food bowl over a water basin, in accordance with some embodiments.

FIG. 8 is a bottom view of a bowl extension 800 that mates with a top portion of a column section for elevating a pet food bowl over a water basin, in accordance with some embodiments. In particular, the extension 800 can mate with the segment 700 of FIG. 7, with the exception that orientation feature 702 with interfere with orientation feature 804 on the inside wall of the extension 800, in space 802 inside the extension 800. Windows 604 are shown in broken line in this view as they are hidden by the material of the bottom of the extension 800. Orientation feature 804 prevents the second bowl form being oriented such that orientation feature 804 would be positioned where orientation feature 702 is location because they two feature cannot occupy the same space. Thus, the orientation features 702, 804 can be positioned such that the second bowl cannot be oriented with its front toward the open portion of the first bowl.

Figure 9:
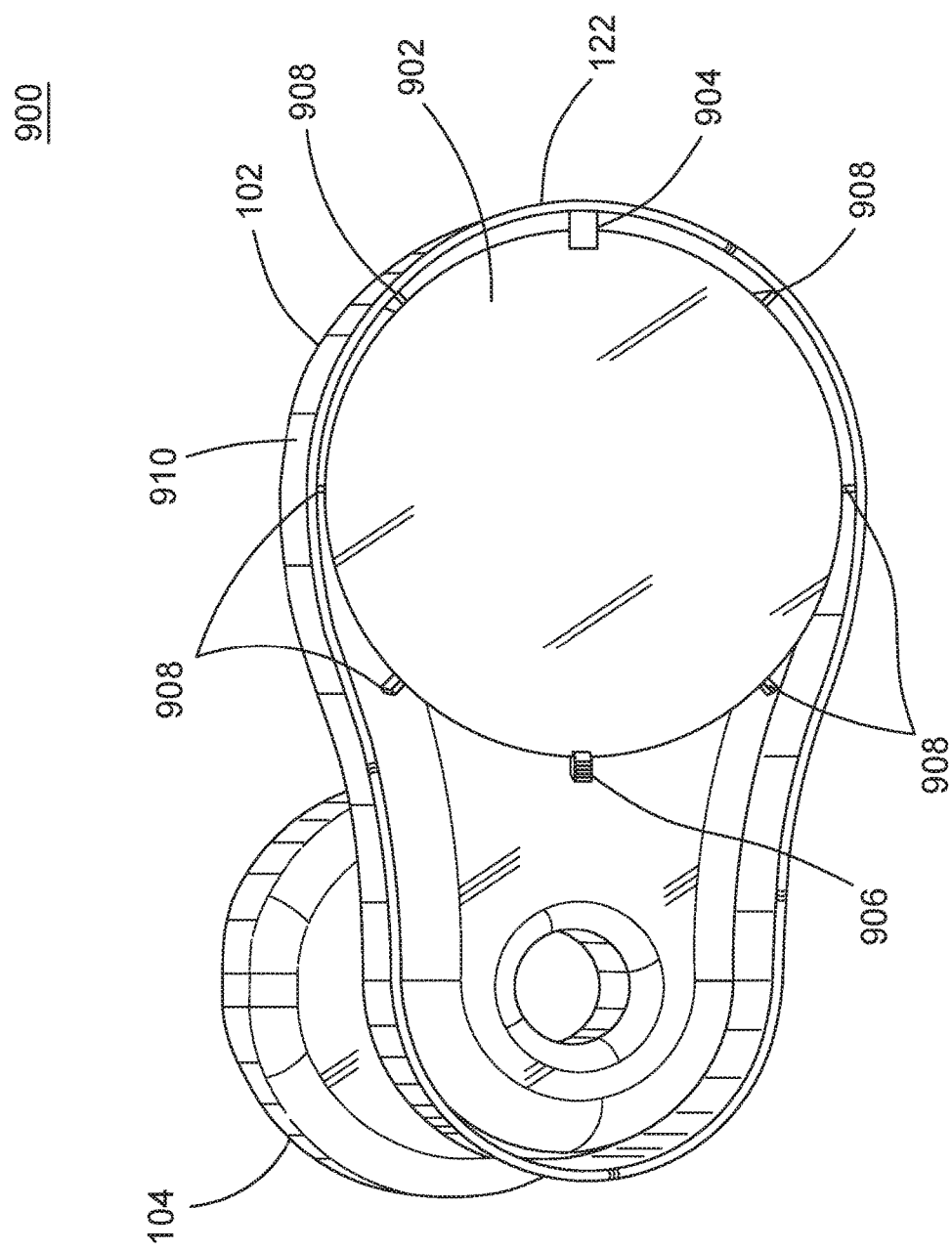
FIG. 9 is a bottom view of a pet food and water bowl apparatus, in accordance with some embodiments.

FIG. 9 is a bottom view 900 of a pet food and water bowl apparatus, in accordance with some embodiments. Since the height of the second bowl 104 over the first bowl 102 effectively makes the second bowl 104 a lever with respect to the first bowl 102, an instability can result if a vigorously feeding pet pushes against the second bowl 104. Filling the first bowl with water will add stabilizing weight, but in some embodiments an additional weight plate 902 can be retained at the bottom of the first bowl 104 using several weight retaining features. A static support 904 is configured to go under the weight plate 902 and hold it up at one end, and a retaining latch 906 can be used on an opposite side of the weight plate 902. One or more guide posts 908 can further align the weight plate into position to be held between the support 904 and the retaining latch 906. The weight plate can be concealed by the skirt 910 on the outside of the second bowl 102, and sit under the basin of the first bowl. Thus, the skirt 910 extends down farther than the depth of the basin from the rim of the first bowl 102. The weight plate 902 is disposed under the open portion of the first bowl to place the weight at the widest portion of the first bowl 102.

Figure 10:
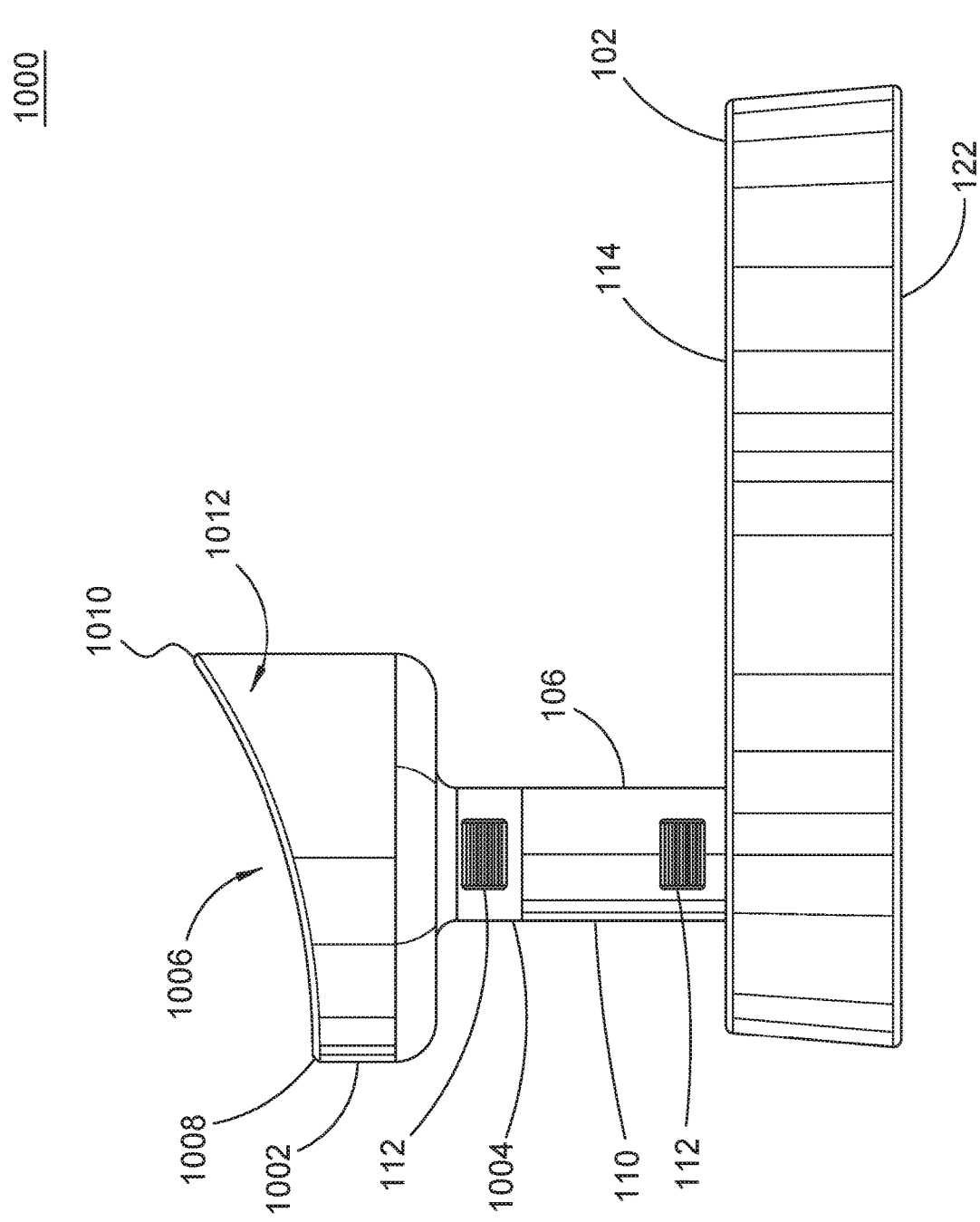
FIG. 10 is a side elevational view of a pet food and water bowl apparatus, in accordance with some embodiments.
Figure 11:
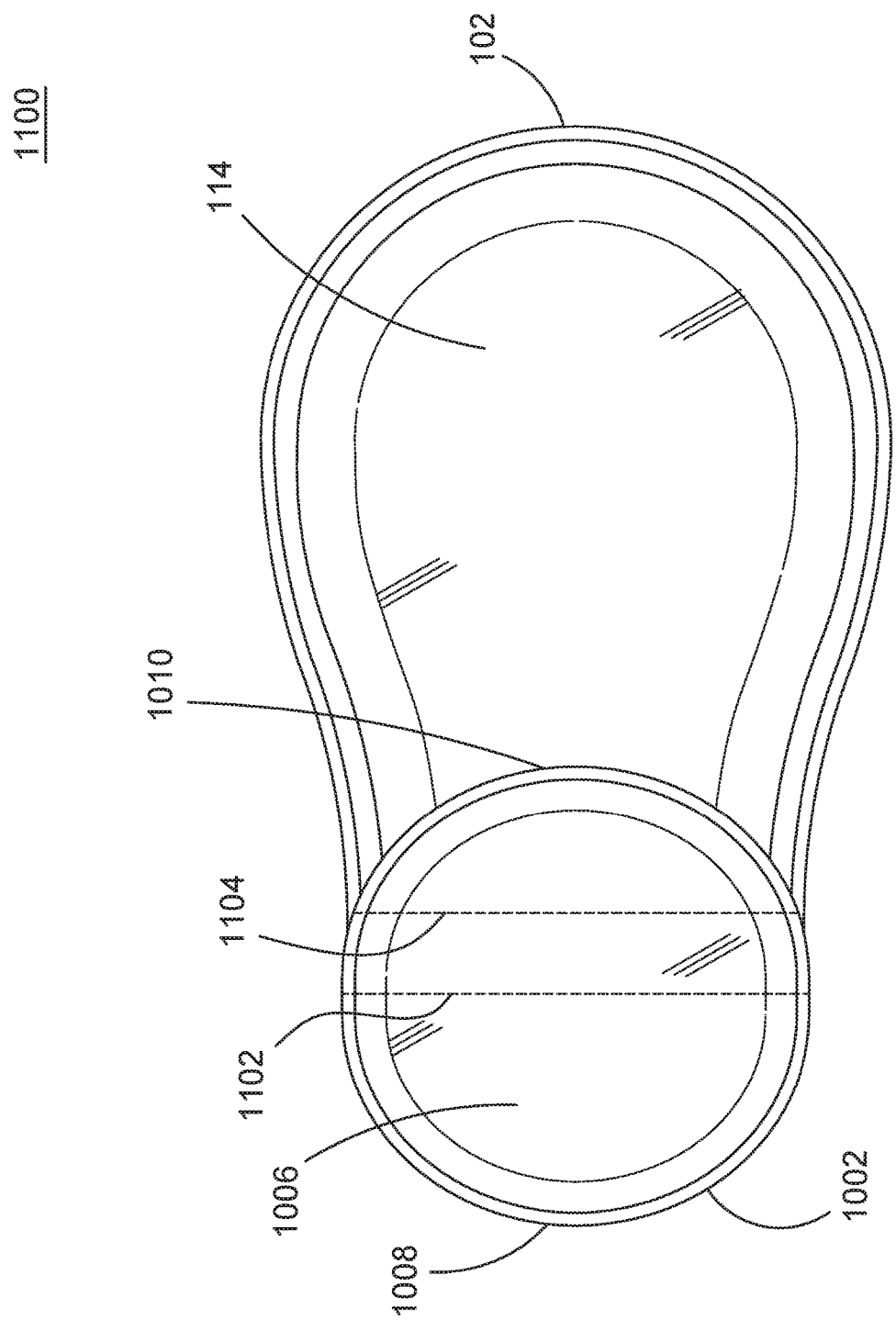
FIG. 11 is a top plan view of a pet food and water bowl apparatus, in accordance with some embodiments.

FIGS. 10 and 11 show various view of a pet food and water bowl apparatus in which the second bowl is shaped with a partial circumferential wall around the rim of the second bowl, rather than a partial cover that extend over the basin of the second bowl. In particular, FIG. 10 shows a side elevational view 1000 of a pet food and water bowl apparatus, and FIG. 11 shows a top plan view 1100 of the pet food and water bowl apparatus, in accordance with some embodiments. The first bowl 102 can be the same as that shown in FIGS. 1-3, for example, as is the support structure 106 on which the second bowl 1002 sits over the covered portion of the first bowl 102. The second bowl 1002 has a lower extension 1004 that couples to the support structure 106. Further, the second bowl 1002 include a front 1008 and a back 1010 along a rim which defines an opening 1006. A circumferential wall 1012 increases in height around the rim from the front 1008 to the back 1010 of the rim of the second bowl 1002. The circumferential wall 1012 tends to orient the pet to feed from the lower side (e.g. the front 1008), and it tends to prevent food from falling into the first bowl 102. The circumferential wall 1012 can, in some embodiment rise at an angle (or parabolic) as shown, or it can be an abrupt rise to a stepped height over that at the front 1008, and should extend around to the sides of the second bowl 1002 to facilitate a choice of orientation of the second bowl 1002 while still preventing food from spilling or being knocked into the first bowl 102. Further, the shape of the second bowl 1002 should correspond to the shape of the covered portion of the first bowl 102 in each mounting orientation so that the second bowl 1002 can completely cover the covered portion of the first bowl 102, vertically, to prevent food from falling into the covered portion of the first bowl 102. This can be seen in FIG. 11, for example, where the outside diameter or width 1102 of the second bowl 1002 is larger than the width 1104 of the covered portion of the first bowl 102.

Figure 12:
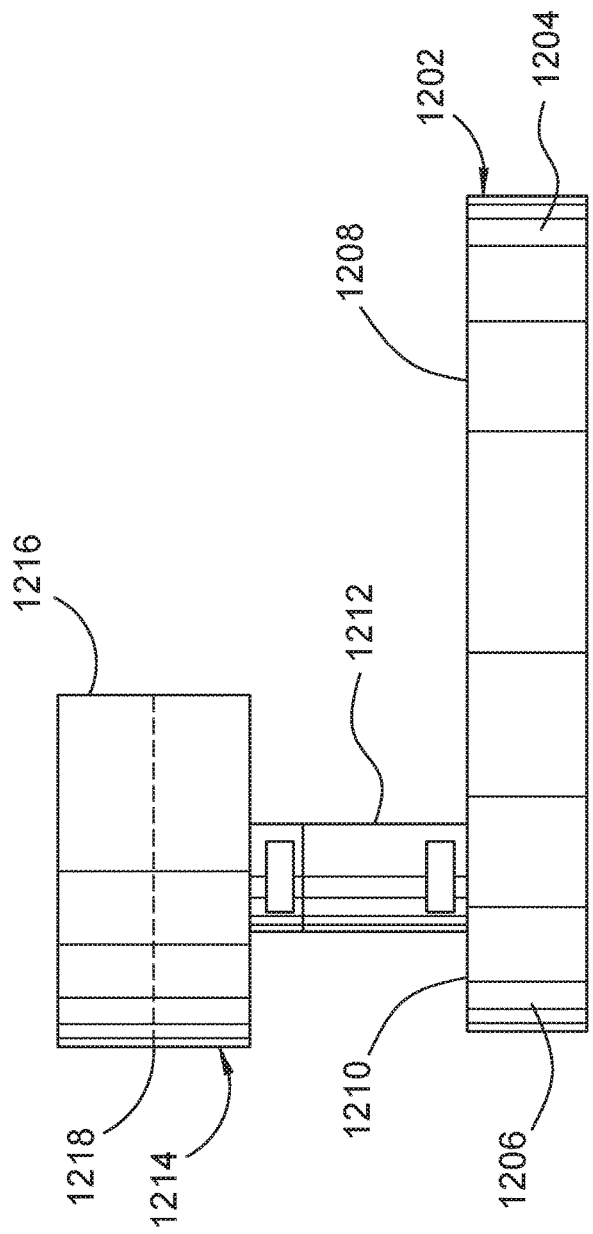
FIGS. 12-13 show an alternative configuration of a pet bowl and bowl apparatus, in accordance with some embodiments.
Figure 13:
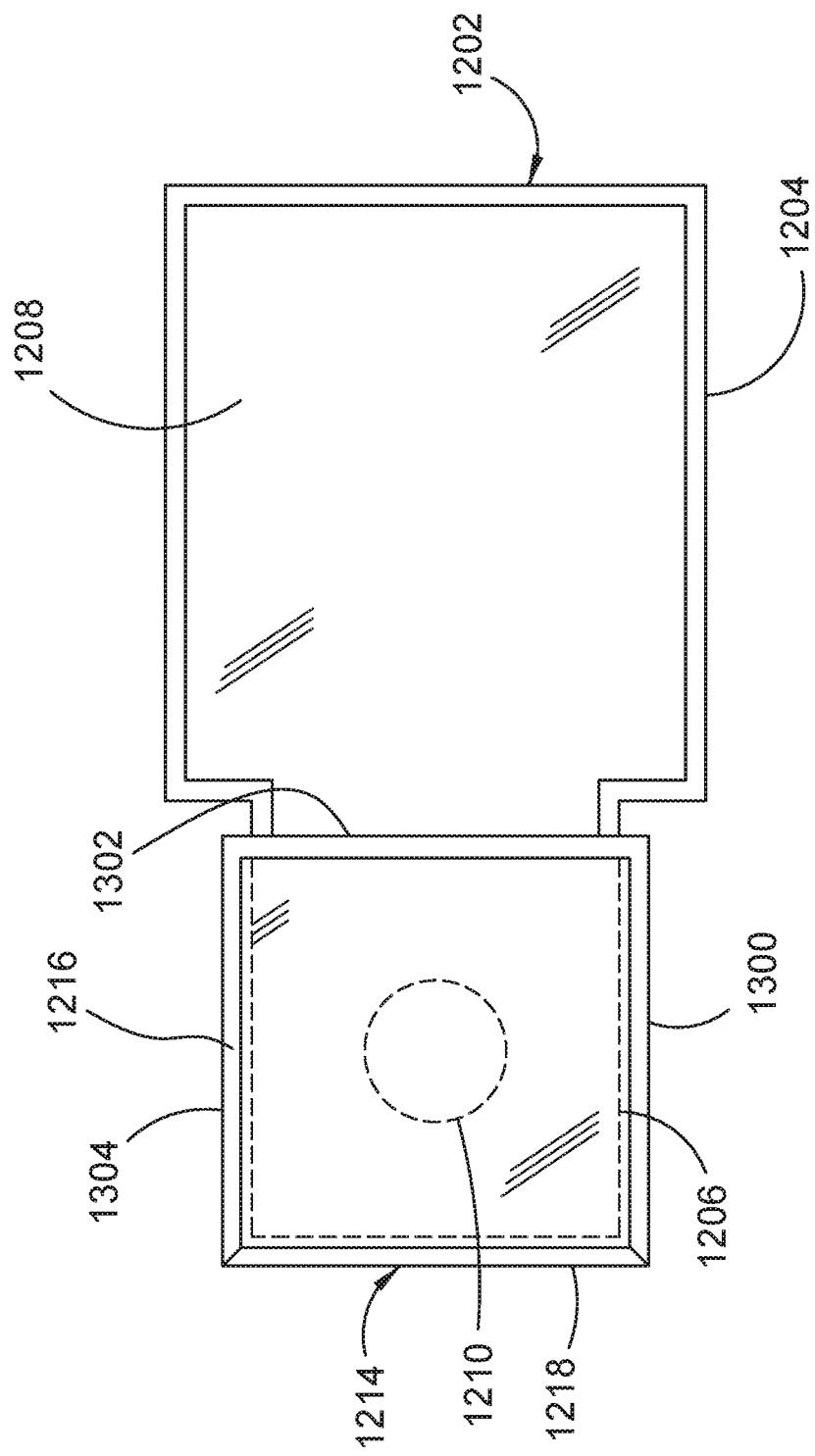

FIGS. 12-13 show an alternative configuration of the pet bowl and bowl apparatus 1200, in accordance with some embodiments. In particular, the apparatus 1200 uses square or squared bowls. A first bowl 1202 comprises two contiguous squared sections including an open portion 1204 and a covered portion 1206. A second bowl 1214 is mounted on a support structure 1212 that rises from the basin 1210 of the covered portion 1206 of the first bowl 1202. The second bowl 1214 does not extend over the open portion 1204, leaving a large opening over the basin portion 1208 of the open portion 1204. The second bowl 1214 includes a front portion 1218 the defines a rim line, and a three sided wall 1216 extends upward and around the other three sides of the second bowl 1214. In FIG. 13 it can be seen that the perimeter of the covered portion 1206 of the first bowl 1202 is within the outer perimeter of the second bowl 1214. Further, the front 1218 of the second bowl 1214 defines a rim, and the three sided wall 1216 extends upwards from the level of the rim, and around three sides 1300, 1302, 1304 of the second bowl 1214. The second bowl 1214 can be oriented as shown, or turned ninety degree from the shown orientation in either direction. However, orientation features in the support structure 1212 could be used to prevent the second bowl 1214 from being oriented one hundred eighty degrees from the orientation shown here (i.e. facing the open portion 1204). An outset view 1306 of the second bowl 1214 shows a perspective view of the second bowl, turned to the right, where the three sided wall 1216 can be seen relative to the front of the second bowl 1214.

Figure 15:
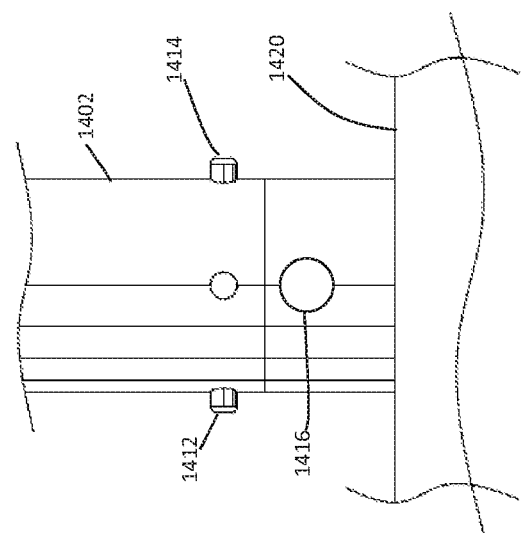
FIGS. 14-15 show a side view of an alternative retention mechanism for retaining a support structure on the lower bowl, in accordance with some embodiments.
Figure 14:
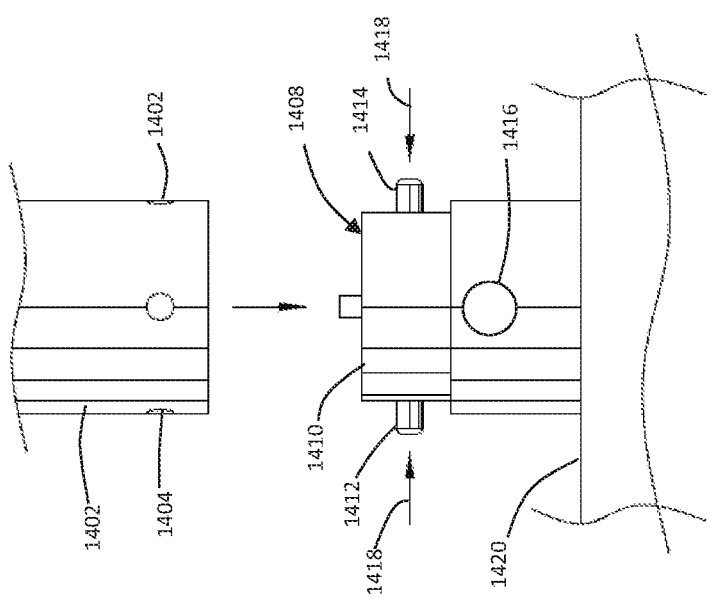

FIGS. 14-15 show a side view of an alternative retention mechanism for retaining a support structure on the lower bowl, in accordance with some embodiments. A base or extension 1402 is configured to fit over a portion of the lower support structure segment 1408, and includes one or more holes 1404, 1406 through the sidewall of the base 1402. The lower support structure segment 1408 is either a part of, or attached to the basin of the lower bowl 1420 such that the lower support structure segment 1408 can be surrounded by water when water is placed in the basin of the lower bowl 1420. Both the base 1402 and the lower support structure segment 1408 can be cylindrical, or have a square cross section. The upper portion 1410 of the lower support structure segment 1408 can be reduced in size to fit within the lower portion of the base 1402. A pair of retractable protrusions 1412, 1414 extend outward from the side of the upper portion 1410 of the lower support structure segment 1408, and are movable in the horizontal direction. Specifically, the retractable protrusions 1412, 1414 are movable inwardly sufficient to allow the base 1402 to fit over the upper portion 1410 of the lower support structure segment 1408 such that holes 1404, 1406 align or interface, respectively, with protrusions 1412, 1414. A mechanism inside the lower support structure segment 1408 is operated by a button 1416 to cause the retractable protrusions 1412, 1414 to retract, as indicated by arrows 1418. Alternatively, the faces of the protrusions can be angled to allow the bottom of the base to slip over the protrusions while pushing them inward at the same time, and to allow a user to press the protrusions inward and allow the base 1402 to be removed over the protrusions, having been biased inward. When the base 1402 is properly positioned on the lower support structure segment 1408, the button 1416 can be released, allowing the retractable protrusions 1412, 1414 to extend outward through the holes 1404, 1406, thereby retaining the base 1402 on the lower support structure segment 1408. FIG. 15 shows the base 1402 retained on the lower support structure segment 1408 with the retractable protrusions 1412, 1414 passing through the wall of the base 1408 (i.e. at holes 1404, 1406). The base 1402 and lower support structure segment 1408 can be designed to allow only specific orientations of the food bowl by using mechanical features that allow the base 1402 to fully seat onto the lower support structure segment 1408 only when the base 1402 is in an allowed position or orientation, in order to prevent the front of the food bowl to be over the basin of the lower bowl.

FIG. 16 shows a side view an alternative arrangement for bowl having a cover that attaches to a food bowl, and which can be repositioned on the food bowl, in accordance with some embodiments. In embodiments corresponding to that of FIGS. 16-18, the food bowl 1602 is placed over the water bowl (not shown here) as in previous drawings. However, rather than the food bowl 1602 being re-orientable around the vertical axis of the support structure, the food bowl 1602 can remain fixed in position and the cover 1604 can detachable from the food bowl 1602 and can be moved to different positions on the food bowl 1602 to accomplish an equivalent result. Accordingly, at the bottom of the cover 1604 there can be a latch component 1606 that mates with corresponding latch receptacles 1608 in the sidewall of the food bowl 1602. The latch receptacles 1608 can be provided in locations on the rim of the food bowl 1602 to ensure that the cover 1604 can't be placed on the food bowl 1602 in an orientation that allows food in the food bowl 1602 to fall into the water bowl below. Specifically, there is no latching receptacle 1608 that allows the cover 1604 to be placed on the food bowl 1602 such that the open (uncovered) side of the food bowl 1602 is over the exposed portion of the water bowl, between the main drinking basin of the water bowl (e.g. 114) and the portion around the support structure (e.g. 115).

Figure 18:
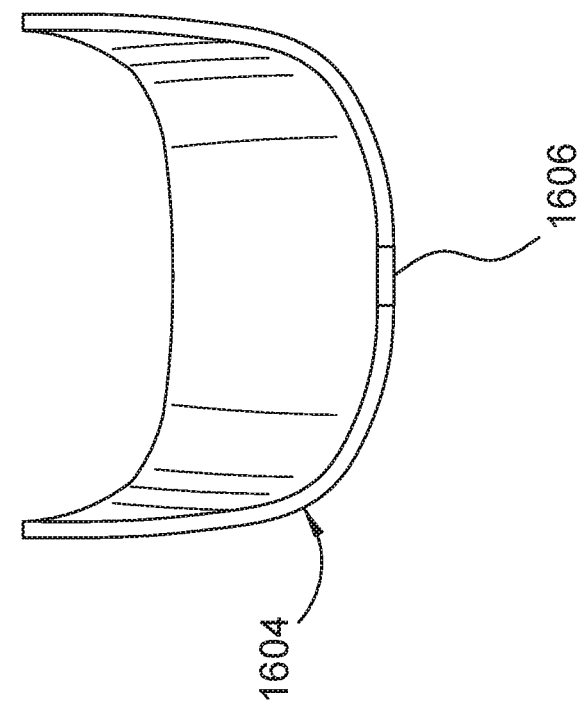
FIG. 18 is a bottom view of a cover that is configured to attach to a complementarily designed food bowl, in accordance with some embodiments.
Figure 17:
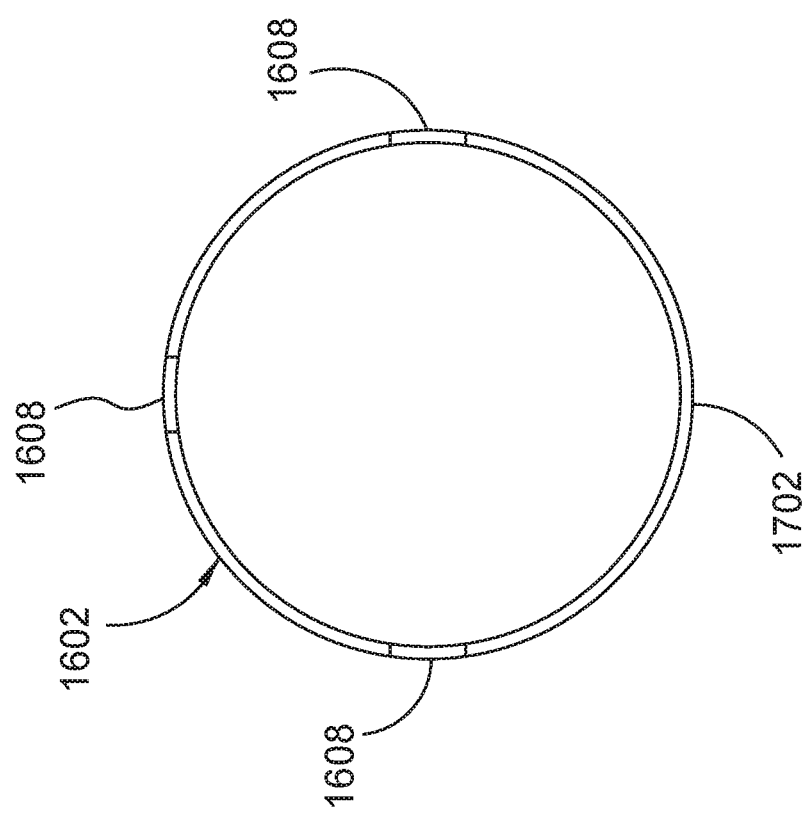
FIG. 17 is a top view of a food bowl that is configured to receive a cover that can be repositioned on the food bowl to one of several positions except a position that allows food to fall out of the food bowl into the water below, in accordance with some embodiments.

FIG. 17 is a top view of the food bowl 1602 of FIG. 17, which is configured to receive a cover 1604 that can be repositioned on the food bowl 1602 to one of several positions except a position that allows food to fall out of the food bowl 1602 into the water below, in accordance with some embodiments. The cover 1604 has a latch component 1606 that extends downward from the bottom rim of the cover 1606, at the middle of the bottom rim. The food bowl 1602 include latch receptacles 1608 in the top rim of the food bowl 1602 that are configured to receive and retain the latch component 1606 if/when the latch component 1606 is inserted into the latch receptacle 1608. As shown here, there are latch receptacles 1608 in three places, with two of the receptacles being opposite each other, and another being midway around the rim between the opposing latch receptacles. A front position 1702 lacks a latch receptacle. This configuration of latch receptacles, along with the cover 1604 having the latch component 1606 at the mid-point of its lower rim, allows the cover 1604 to be positioned facing the front (i.e. away from the drinking portion 114 of the water bowl), or to either side, but not to face the drinking portion of the water bowl. This prevents a user from aligning the cover in a way that allows food to fall from the food bowl 1602 into the water bowl below. FIG. 18 is a bottom view of the cover 1604 and the latching component 1606 can be seen at the midway point of the lower rim of the cover 1604. The latching component 1606 prevents the user from placing the cover 1604 on the food bowl 1602 facing the drinking portion of the water bowl below because the food bowl 1602 lacks a latch receptacle at position 1702.

Other means of preventing misalignment of the food bowl or the opening of the food bowl created by the cover, whether the cover is detachable or integrally formed with the food bowl, will occur to those skilled in the art. Such other arrangements, of course, are equivalent in function in that the operate in the same manner for the same purpose and accomplish an equivalent result.

FIG. 19 is a partial perspective view of a support structure for supporting a food bowl over a water bowl, in accordance with some embodiments. The detail here focuses on the support structure in allowing the food bowl to be positioned in various orientations. The food bowl for this example can have a cover or cover portion, as previously described, which blocks food from falling out of the food bowl around about half of the circumference of the food bowl, if circular, or the sides and back of the food bowl otherwise. Here, the base 1902 is disposed in the covered portion of a water bowl, and has an upper surface 1904 from which is non-circular member 1906 extends vertically. An upper support structure member 1908 is attached to, or formed on a food bowl, and extends downward from the food bowl, and has a bottom surface 1910 that mates with the top surface 1904 of the base 1902. A vertical channel 1912 is formed in the upper support structure member 1908 and is sized to receive the non-circular member 1906 in a close relationship that prevents rotation of the upper support structure member 1908, and hence the food bowl. No latching is used in some embodiments, and the food bowl can be oriented in any direction allowed by the interface of the non-circular member 1906 and the vertical channel 1912. In the example shown in FIG. 19, the vertical member 1906 has a square profile, allowing four different orientations. This arrangement simplifies the assembly by eliminating the retention, and requires the user to take care not to orient the open portion of the food bowl to face the drinking portion of the water bowl, below.

Figure 20:
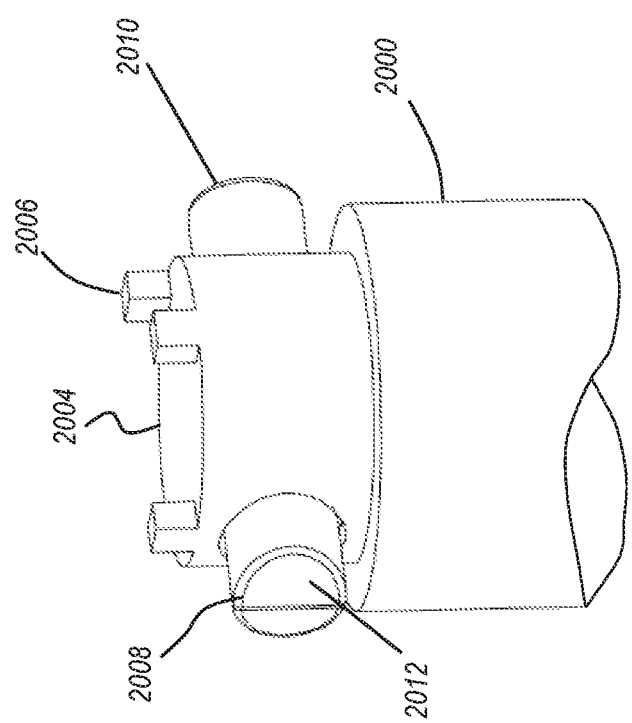
FIG. 20 is a sectional perspective view of a support portion using opposing deflectable projections for retaining the support sections together, in accordance with some embodiments.

FIG. 20 is a sectional perspective view of a support portion 2000 using opposing deflectable projections 2008, 2010 for retaining support sections together, or securing a feed bowl to the top of a support column section, in accordance with some embodiments. Support portion 2000 forms at least part of a support column and can interface with either another column section or the correspondingly configured receptacle on the bottom of a feed bowl. A narrowed portion 2004 is sized to fit within the inner diameter of another support section or a bowl support receptacle. Portions 2006 extend upwards to ensure proper orientation of a bowl by either interfering with structure in receptacle on the bottom of the bowl, or falling into corresponding recesses to ensure the bowl is not facing the drinking portion of the lower/water bowl. A pair of deflectable protrusions 2008, 2010 extend outward, horizontally, from within the support portion 2000 in the narrowed portion 2004. Each of the opposing deflectable protrusions 2008, 2010 are biased outward, and can be pushed inward to clear fitting into another section. Each protrusion 2008, 2010 has an angled face such as angled face 2012 to facilitate connection and disconnection of sections. When the support portion 2000 is connected to another section of the assembly, the user can urge protrusions 2008, 2010 inward, and insert the narrowed portion 2004 into the other section, which includes holes corresponding to protrusions 2008, 2010. The user can push the protrusions 2008, 2010 inward sufficiently to clear the inner diameter of the joining section. Then the user can turn, on a vertical axis, the two sections until the protrusions 2008, 2010 pop out through the corresponding holes in the joining portion. In disconnecting sections, since it would be difficult for a user to press the protrusions 2008, 2010 in far enough to allow vertical movement, the angled faces (e.g. 2012) allow the user to push the protrusions 2008, 2010 in somewhat, and then turn the sections (about a vertical axis) to depress the protrusions 2008, 2010 inward against the inner wall of the adjoining section, thereby allowing the adjoining section to be removed.

Figure 21:
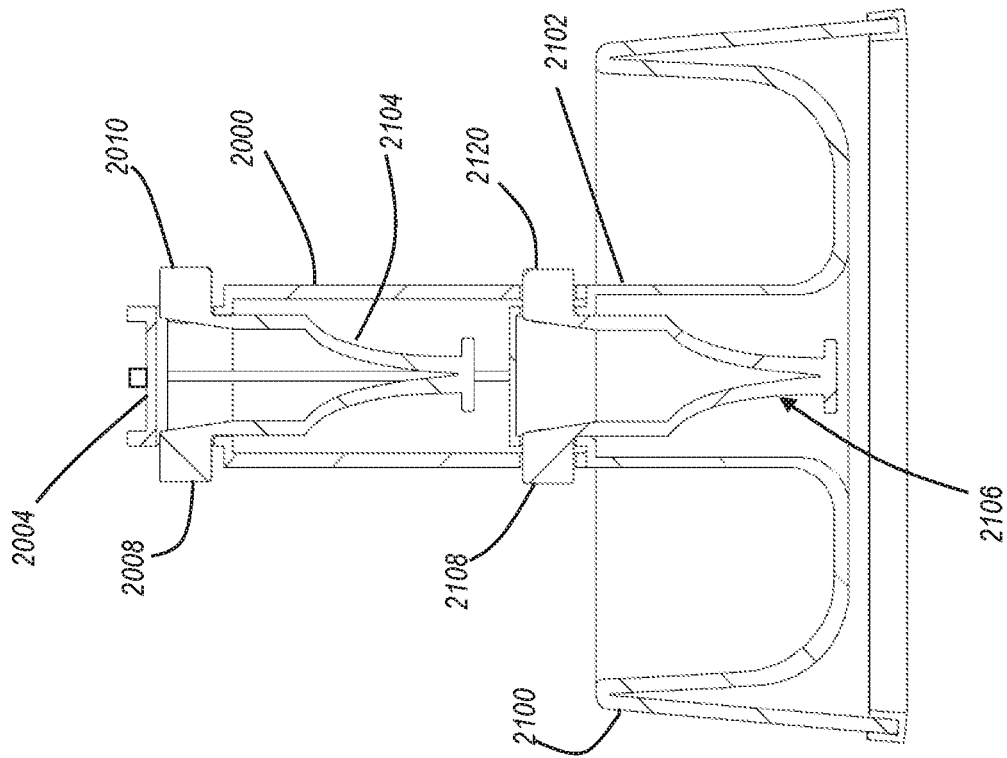
FIG. 21 is a side cutaway view through the support column showing the opposing deflectable projection structure, in accordance with some embodiments.

FIG. 21 is a side cutaway view through the support column showing the opposing deflectable projection structure, in accordance with some embodiments. In this view it can be seen that the opposing protrusions 2008, 2010 are part of a common structure 2104, which can be made of a plastic material to allow deflection of the protrusions 20008, 2010. The structure 2104 is a generally "V" shaped structure that provides a spring effect so that when the protrusions 2008, 2010 are pushed towards each other, the spring effect of the structure 2104 urges the protrusions 2008, 2010 outward, away from each other. As shown here, the structure 2104 is located in a column portion 2000 that is itself connected to a base 2102 of the bowl 2100 using another protrusion structure 2106 in the same manner. Protrusions 2108, 2110 align with, and pass through holes located in the bottom of support portion 2000. FIG. 22 is a bottom view of a support section 2000 including a retaining structure 2104 having opposing deflectable projections 2008, 2010, in accordance with some embodiments. The view shown here is looking upwards into the bottom of support portion 2000.

Figure 23:
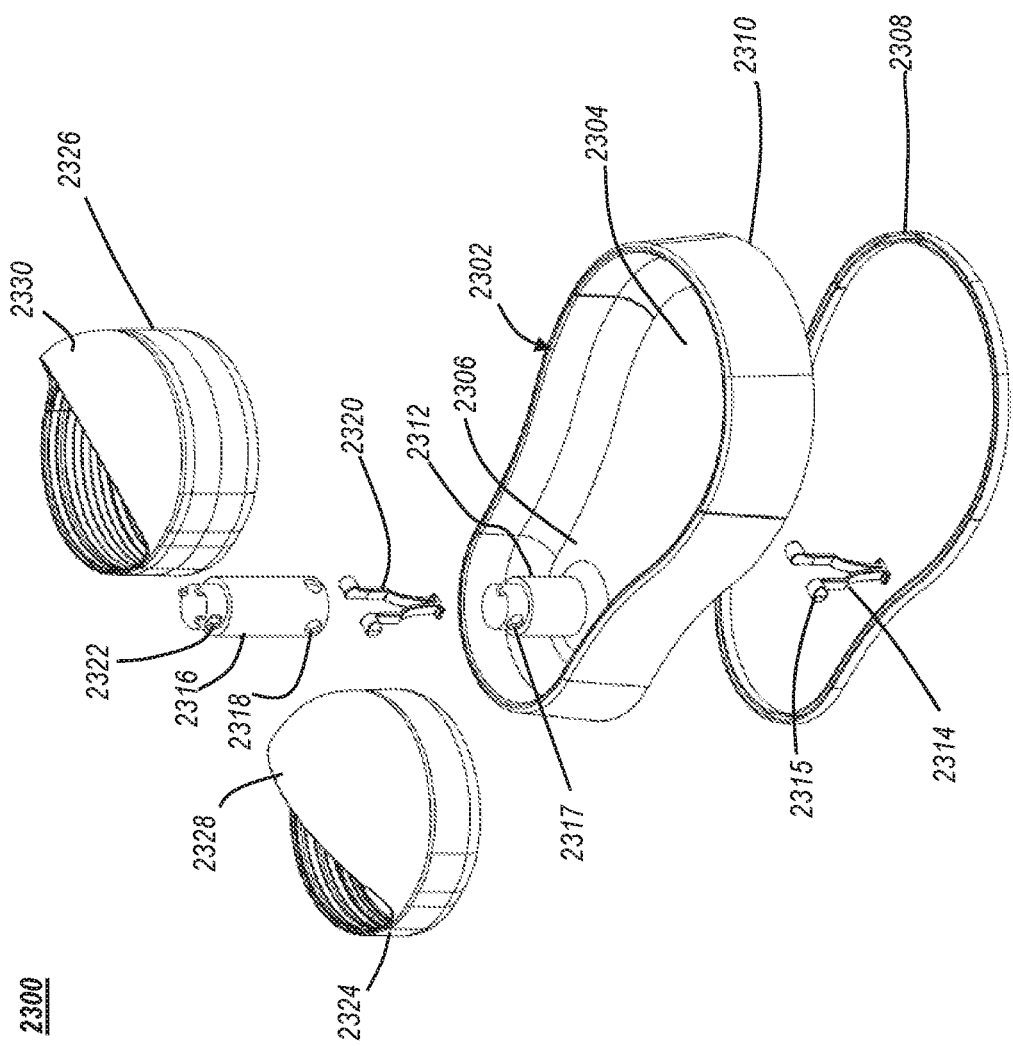
FIG. 23 is an exploded perspective view of a pet feeding apparatus including retaining features with opposing deflectable projections, in accordance with some embodiments.

FIG. 23 is an exploded perspective view of a pet feeding apparatus 2300 including retaining features with opposing deflectable projections, in accordance with some embodiments. A lower bowl 2302 is intended to contain water to both provide water for a pet to drink, as well as to guard a support structure 2312 located in a covered portion 2306 of the bowl 2302. The covered portion 2306 will be covered by an upper bowl in which pet food is placed. The non-covered portion 2304 will not be covered, allowing access to the water for the pet to drink. A bottom portion of the wall of the lower bowl 2302 can be covered with shoe 2308 that is made of a material such as rubber, and is intended to resist movement of the assembly 2300. A first retaining structure 2314 can fit within the lower support structure 2312 in the bowl 2302. Protrusion 2315 can fit through opening 2317 in the lower support structure 2312. An upper support structure 2316 can attach to the lower support structure 2312, and housing a second retaining structure 2320 that can be identical to the first retaining structure 2314, and has projections that fit through holes (e.g. 2322) in the top of upper support structure 2316. Second retaining structure 2320 is used to retain an upper bowl, such as either bowl 2324, or bowl 2326, as preferred by the user. The bottom of each bowl 2324, 2326 includes a receptacle that interfaces with the top of upper support section 2316 in the same manner as upper support section 2316 interfaces and is retained on lower support structure 2312, and the second retaining structure 2320 ensures that the bowl (whichever is used) is retained on the assembly 2300. Bowls 2324, 2326 differ in capacity and amount of coverage over the bowl by the cover portions 2328, 2330, respectively. Both cover portions 2328, 2330 can be partial dome structures, that, at their lower periphery where they meet the circular bowl, extend around at least half of the circular perimeter of their respective bowls.

A pet food and water bowl apparatus has been disclosed that keeps food safe from crawling insects and other pests, and which prevents food from fouling the drinking water. A first bowl is used to hold the water, and a support structure is provided in the first bowl such that the support structure is entirely surrounded by water when water is placed in the basin of the first bowl. A second bowl for food is mounted on top of the support structure that is sized and configured to prevent food from falling into the first bowl and fouling the water. The apparatus is configured to allow re-orientation of the second bowl throughout substantially a 180 degree range, horizontally, to allow the user to configure the direction from which the pet feeds from the second bowl. The second bowl is provided with a perimeter or circumferential wall or partial cover that tends to force the pet to feed from the front of the second bowl, and which prevents food from falling over sides of the second bowl. Thus, the apparatus provides the benefit of preventing crawling insects and other pets from getting to the food by isolating the food bowl with water, and which allows the user to configured the angle at which the pet feed from the food bowl so that the apparatus can be located in various placements in a residence or other location to provide food and water to the pet.

What is claimed is:

1. A pet food and water bowl apparatus, comprising:
a first bowl and a second bowl stacked in a vertical relationship, wherein the second bowl is positioned over a portion of the first bowl on a column that extends upward from a basin of the first bowl, and wherein the column is surrounded by the basin of the first bowl;
the first bowl having an uncovered portion that extends horizontally beyond a vertical projection of the second bowl, the first bowl further having a covered portion under the second bowl in which the column is mounted; and
the second bowl having a basin, and further having a partial cover which extends around approximately half of the basin of the second bowl and which further extends upward over a covered portion of the basin of the second bowl, and wherein the partial cover has a front rim that defines a vertical opening between the covered portion of the basin and an uncovered portion of the basin of the second bowl, and wherein the front rim extends upward from a rim of the second bowl at a first side of the second bowl, and from the rim of the second bowl at a second side of the second bowl to a top of the partial cover.

2. The pet food and water bowl apparatus of claim 1, wherein the second bowl has a width from the first side to the second side such that the second bowl extends outward horizontally such that a vertical projection of the width of the second bowl is outside of a majority of the covered portion of the first bowl.

3. The pet food and water bowl apparatus of claim 1, wherein the column comprises at least an upper portion and a lower portion, the upper portion being coupled to the second bowl and the lower portion being coupled to the first bowl in the basin of the first bowl, and wherein the upper and lower portions are adjustable with respect to each other to at least two positions thereby allowing adjustment of the second bowl to at least two orientations with respect to the first bowl, and wherein the upper portion and lower portion are configured to limit a range of the at least two orientations to be not more than 180 degrees, and to prevent the open portion of the second bowl from facing towards the uncovered portion of the first bowl.

4. The pet food and water bowl apparatus of claim 3, wherein one of the at least two orientations orients an open portion of the second bowl directly away from the exposed portion of the first bowl.

5. The pet food and water bowl apparatus of claim 1, further comprising a weight retaining feature on an underside of the first bowl that is configured to retain a weight plate concealed under the first bowl.

6. The pet food and water bowl apparatus of claim 1, wherein the column has a height that is adjustable.

7. The pet food and water bowl apparatus of claim 6, wherein the column is configured to be modular, and wherein the column comprises an upper portion and a lower portion and can receive at least one middle portion to adjust the height of the column.

8. The pet food and water bowl apparatus of claim 1, wherein the cover of the second bowl is detachable from the second bowl.

9. A pet food and water station for keeping crawling insects out of pet food and for keeping pet food out of water, the pet food and water station comprising:
a water bowl having a basin, the basin having a drinking portion and a covered portion;
a base extending vertically from the covered portion and positioned in the water bowl so as to be surrounded by water when water is present in the basin of the water bowl; and
a food bowl mounted on top of the base, the food bowl having a partial cover that extends around approximately half of a basin of the food bowl, and upward-to extend over a portion of the basin of the food bowl thereby creating a covered portion of the basin of the food bowl, the basin of the food bowl having an uncovered portion over which the cover does not extend, the food bowl being sized so that the uncovered portion of the food bowl extends, horizontally, farther outward than the covered portion of the water bowl beneath the uncovered portion of the food bowl, and wherein the partial cover has a front rim that defines a vertical opening between the covered portion of the basin and an uncovered portion of the basin of the food bowl, and wherein the front rim extends upward from a rim of the food bowl at a first side of the food bowl, and from the rim of the food bowl at a second side of the food bowl, to a top of the partial cover.

10. The pet food and water station of claim 9, wherein the base is height adjustable.

11. The pet food and water station of claim 10, wherein the base includes a feature that prevents the food bowl from being positioned such that the uncovered portion of the food bowl is over the drinking portion of the water bowl.

12. The pet food and water station of claim 9, wherein the partial cover is integrally formed on the food bowl.

13. The pet food and water station of claim 9, wherein the partial cover is a separate piece from the food bowl and is configured to attach to a rim of the food bowl.

14. The pet food and water station of claim 13, wherein the partial cover is configured to allow attachment of the partial cover in one of at least two positions on the rim, and wherein the rim of the food bowl lacks features to allow attaching the partial cover to the rim of the food bowl such that the rim of the food bowl would be in an orientation where the uncovered portion of the food bowl would be over the drinking portion of the water bowl.

15. The pet food and water station of claim 9, further comprising a weight retaining feature on an underside of the water bowl that is configured to retain a weight plate concealed under the water bowl.

16. A pet feeding apparatus, comprising:
a water bowl having a basin configured to hold water, a drinking portion, and a covered portion;
a base that extends vertically upward from the covered portion and is positioned in the basin so as to be surrounded by water when water is in the basin of the water bowl; and
a food bowl that is configured to be mounted on top of the base, the food bowl has a partial cover that extends approximately halfway around and over a basin of the food bowl and has a front rim defining a vertical opening and that extends upward to a top of the partial cover from a rim of the food bowl at a first side of the food bowl and from a second side of the food bowl, wherein the first side of the food bowl is opposite the second side of the food bowl across the basin of the food bowl, wherein the front rim extends to the top of the partial cover and wherein a horizontal orientation of the food bowl can be changed such that an uncovered portion of the food bowl can be oriented to face away from the drinking portion of the water bowl, or to a first side or a second side, and not facing the drinking of the water bowl.

17. The pet feeding apparatus of claim 16, wherein the base is height adjustable.

18. The pet feeding apparatus of claim 16, further comprising a weight retaining feature on an underside of the water bowl that is configured to retain a weight plate concealed under the water bowl.

19. The pet feeding apparatus of claim 16, wherein the food bowl is mounted on the base and retained on the base by retractable protrusions in the base that interface with corresponding holes in an extension at a bottom of the food bowl.

* * * * *